US008893022B2

(12) United States Patent
Akram et al.

(10) Patent No.: US 8,893,022 B2
(45) Date of Patent: Nov. 18, 2014

(54) INTERACTIVE AND SHARED VIEWING EXPERIENCE

(75) Inventors: Ijaz Akram, London (GB); Rod Boyd, London (GB); Adam Miller, London (GB); Tom Langan, London (GB); Luca Beltrami, London (GB); Brian Stone, London (GB)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/752,361

(22) Filed: Apr. 1, 2010

(65) Prior Publication Data

US 2011/0246908 A1    Oct. 6, 2011

(51) Int. Cl.
*G06F 3/048*     (2013.01)
*G06F 15/16*     (2006.01)
*H04N 7/15*      (2006.01)

(52) U.S. Cl.
CPC ............................. *H04N 7/157* (2013.01)
USPC ............ 715/752; 715/753; 715/835; 709/231

(58) Field of Classification Search
CPC ...................... H04N 21/4788; H04N 7/157
USPC ..................... 715/752, 753, 835; 709/231
See application file for complete search history.

(56) References Cited

U.S. PATENT DOCUMENTS

| 5,808,662 | A  | 9/1998  | Kinney et al. |
| 6,352,479 | B1 | 3/2002  | Sparks, II |
| 7,088,774 | B1 | 8/2006  | Moni et al. |
| 7,325,066 | B1 | 1/2008  | Fuller et al. |
| 7,669,219 | B2 | 2/2010  | Scott, III |
| 2002/0142842 | A1 | 10/2002 | Easley et al. |
| 2008/0034041 | A1* | 2/2008 | Kang et al. ............... 709/205 |
| 2008/0141326 | A1 | 6/2008  | Thompson et al. |
| 2008/0175273 | A1 | 7/2008  | Johansson et al. |

(Continued)

FOREIGN PATENT DOCUMENTS

EP      0714684 A1    5/1996

OTHER PUBLICATIONS

Sander Limonard, editor, "Together Anywhere, Together Anytime", Large Scale Integrating Project, ICT—Networked Media, D8.3 Market Perspective—version 1, submission date Jul. 27, 2009, pp. 1-47, copyright TA2 Consortium 2009.

(Continued)

*Primary Examiner* — Weilun Lo
*Assistant Examiner* — Peiyong Weng
(74) *Attorney, Agent, or Firm* — Micah Goldsmith; Leonard Smith; Micky Minhas

(57) ABSTRACT

A shared environment is provided for electronic media devices such as game consoles which have Internet connectivity for receiving streaming video content. The shared environment is a virtual world which includes the video content as well as avatars which represent a group of users who have agreed to watch the content together, and scene elements which provide a realistic and eye-catching appearance. The users can enter commands to cause their avatars to emote, such as by cheering. The users can also explore the shared environment from different camera angles. A voice and/or video chat channel can also be enabled to allow the users to speak to and see one another. The video content is synchronized among the electronic media devices of the users so that the users' interactions are more meaningful as they can react to the same portion of the video content in real time.

19 Claims, 20 Drawing Sheets

(56) References Cited

U.S. PATENT DOCUMENTS

| | | | |
|---|---|---|---|
| 2008/0275769 A1 | 11/2008 | Shao | |
| 2008/0307473 A1* | 12/2008 | Allen | 725/104 |
| 2009/0023500 A1 | 1/2009 | Pflum | |
| 2009/0106671 A1* | 4/2009 | Olson et al. | 715/757 |
| 2009/0221367 A1* | 9/2009 | Longley et al. | 463/32 |
| 2009/0259937 A1* | 10/2009 | Rohall et al. | 715/706 |
| 2009/0276802 A1* | 11/2009 | Amento et al. | 725/32 |
| 2009/0307608 A1* | 12/2009 | Kalasapur et al. | 715/753 |
| 2009/0312103 A1 | 12/2009 | Chen | |
| 2009/0325138 A1 | 12/2009 | Shuster | |

OTHER PUBLICATIONS

"Description of and how to use the Xbox Live Party feature", web site, Jul. 16, 2009, Revision 4.10, http://support.microsoft.com/kb/959939.

Image, website, sky_sports_large.jpg(JPEG Image), May 2009, http://www.gagetoid.com/wp-content/uploads/2009-05-sky_sports_large.jpg.

"How to use the Party feature in the Sky Player application", website, Oct. 26, 2009, Revision 1.2, http://support.microsoft.com/kb/976929.

"Start a Party", Start a Party with Your Friends on Your NXE Xbox 360, website, retrieved Mar. 2010, http://support.xbox.com/support/en/us/nxe/xboxlive/xboxlivecommunity/Parties/PartyLeader.aspx.

Toyama, Kentaro, et al., "Probabilistic Tracking in a Metric Space," Eighth International Conference on Computer Vision, Vancouver, Canada, vol. 2, Jul. 2001, 8 pages.

Chinese Office Action dated Mar. 5, 2013, Chinese Patent Application No. 201110087420.4.

Response to Office Action dated Mar. 15, 2013, Chinese Patent Application No. 201110087420.4.

English Summary of the Arguments and Amended Claims filed in Response to Office Action dated Mar. 15, 2013, Chinese Patent Application No. 201110087420.4.

Chinese Office Action dated Aug. 5, 2013, Chinese Patent Application No. 201110857420.4.

Response to Office Action Oct. 16, 2013, Chinese Patent Application No. 201110087420.4.

Notice of Division of Application dated Feb. 19, 2014, Chinese Patent Application No. 201110087420.4.

* cited by examiner

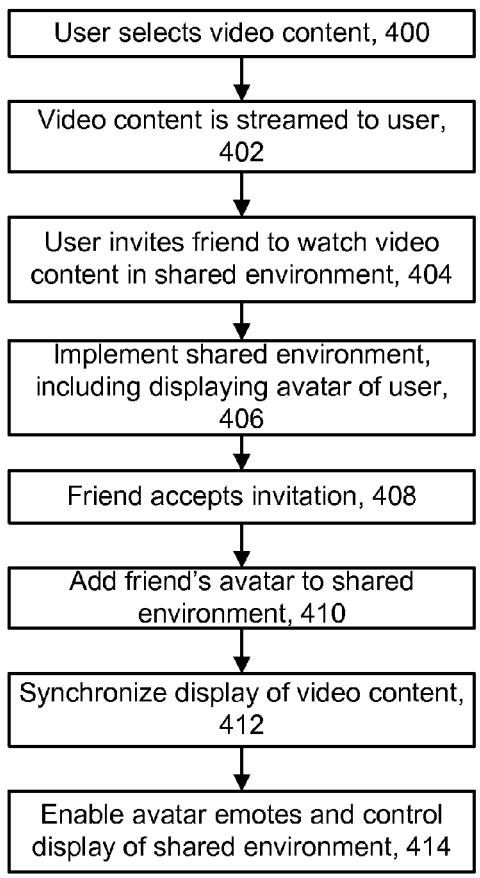
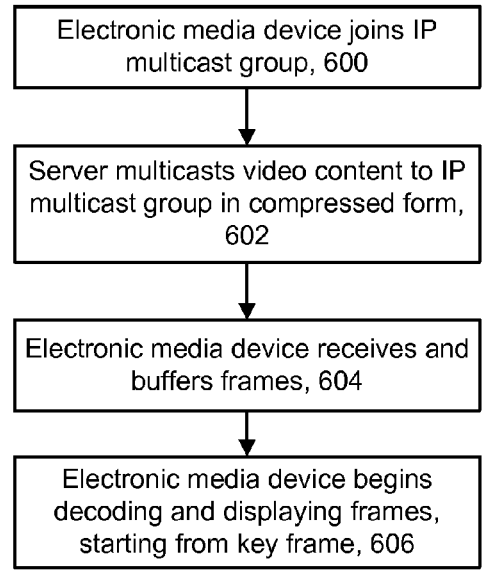
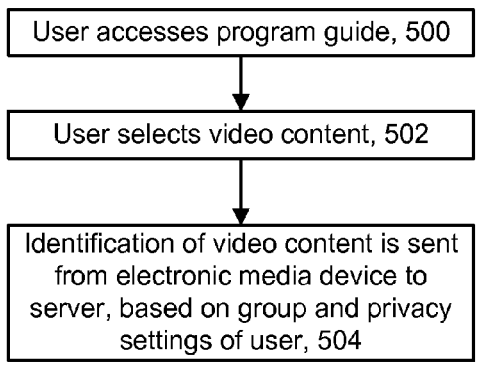
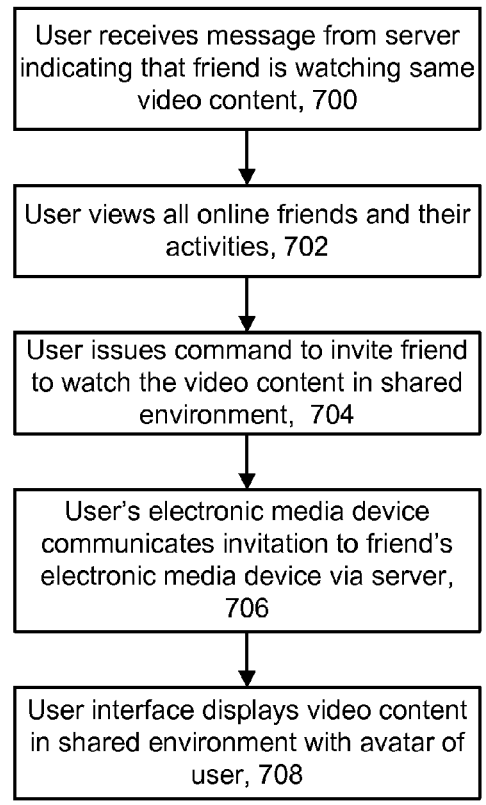

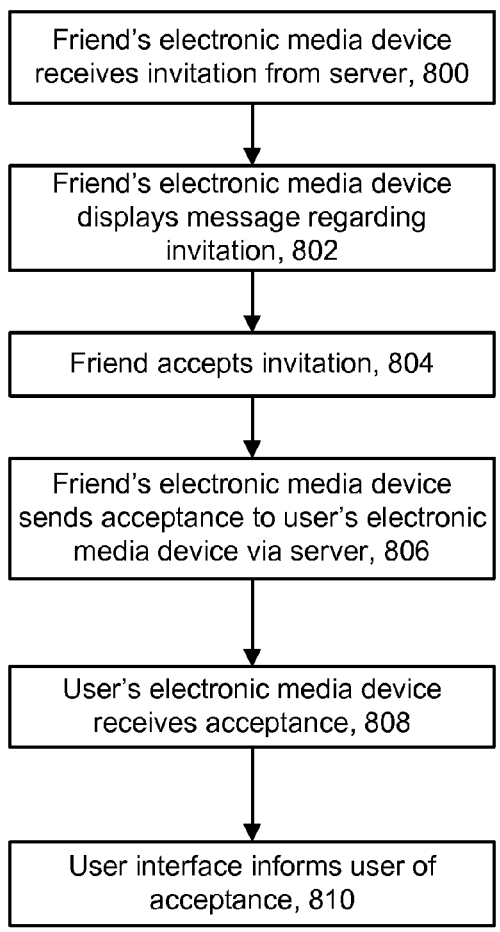
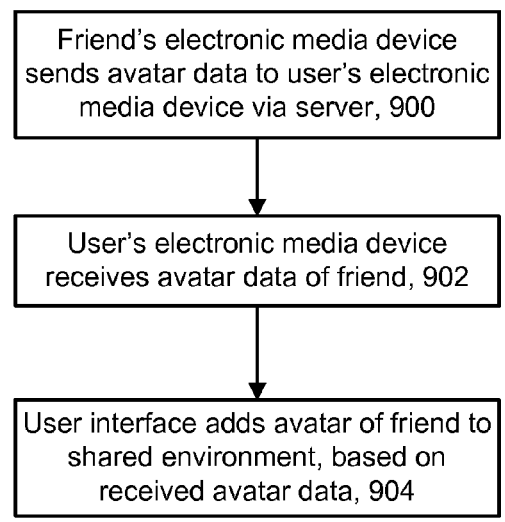

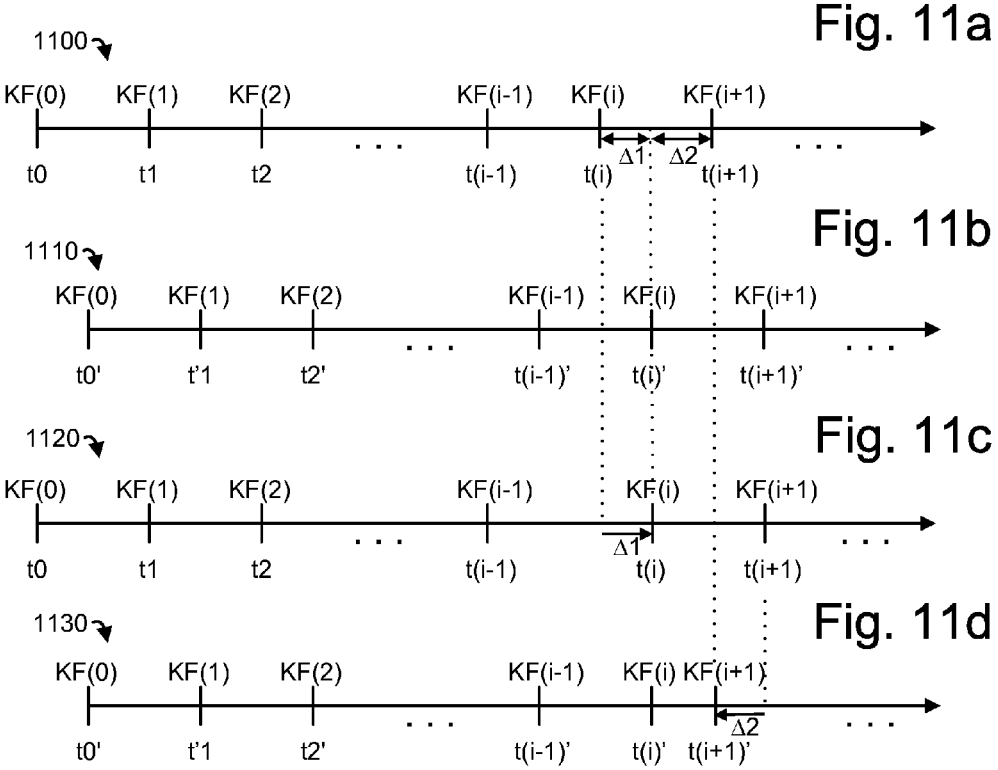

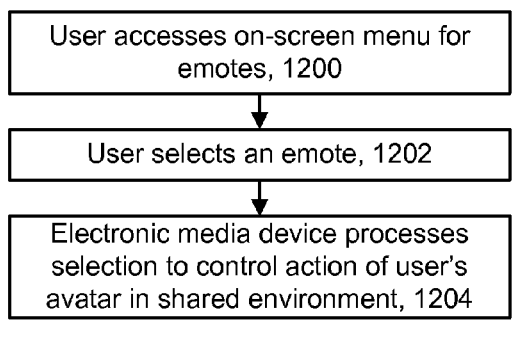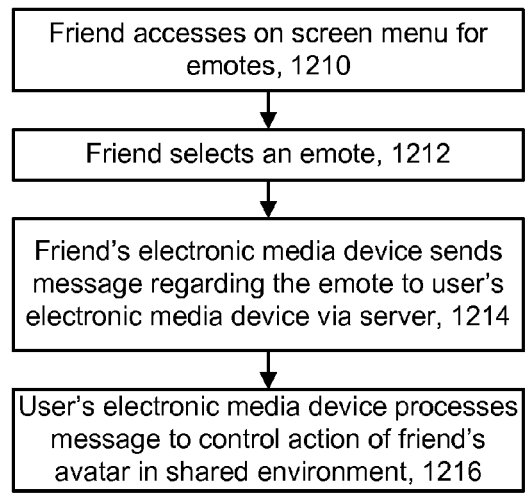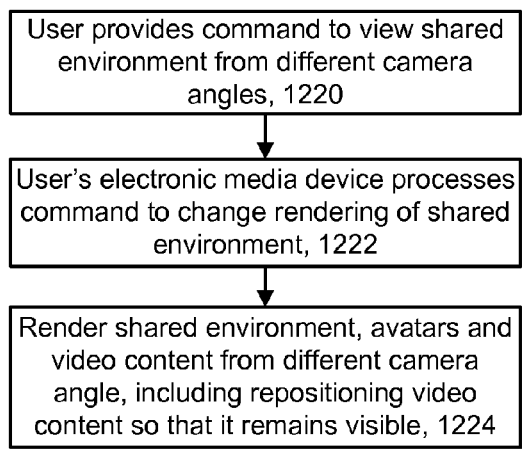

Fig. 13e
1330 —
1332 —
Party options
| Name: | Currently: | Description/Status |
|---|---|---|
| Soccerfan | Watching ESPN | Me |
| Friend1 | Watching ESPN | Invitation sent |
| Friend2 | Watching MTV | |
| Friend3 | Playing Warfare | |
Invite to party, 1324   Back, 1326
Fig. 13f
1340 —
1342 —
Party options
| Name: | Currently: | Description/Status |
|---|---|---|
| Soccerfan | Watching ESPN | Me |
| Friend1 | Watching ESPN | In my party |
| Friend2 | Watching MTV | |
| Friend3 | Playing Warfare | |
Invite to party, 1324   Back, 1326

| Today | 10:00 PM | 10:30 PM | 11:00 PM | 11:30 PM |
|---|---|---|---|---|
| 35 FOOD | Dinner:Imposs... | Dinner:Imposs... | Good Eats | 30 Minute Meals |
| 36 FX-N | That '70s Show | That '70s Show | Damages | |
| 37 TNT | Forrest Gump | | In Good Company | |
| 38 ESPN | Soccer | 1352 | SportsCenter | |
| 39 ESPN2 | World Series of Poker | | World Series of Poker | |
| 40 FSN | FSN Final | FSN Final | Best Sports Show | |

Select, 1354    Back, 1356    Watch with friends, 1358

INTERACTIVE AND SHARED VIEWING EXPERIENCE

BACKGROUND

Television programs, movies and other video content can be delivered via computer networks such as the Internet, as an alternative to conventional over-the-air broadcast, cable or satellite television networks. Multicasting is often used for streaming media and Internet television applications. An electronic media device such as a personal computer or game console at a user's home has the ability to receive, decode and display the video content. However, techniques are needed which allow users to interact and share the viewing experience in real time, even when the users are physically remote from one another.

SUMMARY

A processor-implemented method, system and tangible computer readable storage provide an interactive and shared viewing experience.

To allows groups of friends to interact and share a viewing experience involving streamed video content, a technique is provided which allows one user to invite a friend to join in watching a streamed video event. User interfaces are provided which allow the user to determine if one or more friends are currently watching the same video content, and to invite the friends to join in a shared interactive environment or "party" mode. In this mode, the user and the friends view a common virtual world which includes the video content as well as avatars of the user and the friends interacting in a shared environment, such as a living room or sports stadium. The user and the friends see the same virtual world on their user interfaces, and have the ability to enter commands to cause their avatars to emote, performing specific actions, in reaction to the video content. The user and the friends can control the camera angle from which the shared environment is viewed, moving around the environment. The display of the video content in the shared environment can move so that it remains visible even as the camera angle changes.

Further, the video content is synchronized across electronic media devices of the user and friends. The user interface can switch between a full screen mode in which the video content is displayed without the shared environment, and a mode in which the video content is displayed with the shared environment. In one approach, the shared environment is displayed in a separate picture-in-picture window.

In one embodiment, a processor-implemented method for providing an interactive and shared viewing experience, included a number of processor-implemented steps. The method includes receiving streaming video content at a first electronic media device, associated with a first user, where the streaming video content is received via at least one network from at least one server, which is a streaming server. The method further includes displaying the streaming video content at a user interface of the first electronic media device in synchronicity with a display of the streaming video content at a second electronic media device, associated with a second user. The method further includes displaying a first avatar, which represents the first user, emoting on the user interface, based on data which describes an appearance of the first avatar, and based on control inputs from the first user. The control inputs can be provided via a handheld controller, in one option. The emoting can involve a specified action which the avatar performs, such as clapping or cheering. In this way, the first user can express his or her emotions through the avatar while viewing the video content. The user can customize his or her avatar, including its appearance.

The method further includes receiving data from the at least one network which describes an appearance of a second avatar, with represents the second user, and receiving control inputs via the at least one network for causing the second avatar to emote on the user interface. The second user can similarly cause his or her avatar to emote. The control inputs which cause the second avatar to emote are provided by the second user via the second electronic media device.

The method further includes displaying the second avatar emoting on the user interface of the first user based on the received data which describes the appearance of the second avatar, and the control inputs provided by the second user, where the streaming video content, and the first and second avatars are displayed on the user interface in a shared environment, and the first and second users interact, while viewing the streamed video content, by causing the first and second avatars, respectively, to emote. In this manner, both the first and second avatars can be displayed emoting and otherwise interacting in a common shared environment on the user interfaces of both users. The shared environment can include any number of users, e.g., one or more.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 4 depicts a method for providing a shared environment for viewing streamed video content.

FIG. 5 depicts details of a user selecting video content (step 400 of FIG. 4).

FIG. 6 depicts details of streaming video content to a user (step 402 of FIG. 4).

FIG. 7 depicts details of a user inviting a friend to watch video content in a shared environment (step 404 of FIG. 4).

FIG. 8 depicts details of a friend accepting an invitation to watch video content in a shared environment (step 408 of FIG. 4).

FIG. 9 depicts details of adding a friend's avatar to a shared environment (step 410 of FIG. 4).

FIG. 11a depicts a time line of a first electronic media device.

FIG. 11b depicts a time line of a second electronic media device.

FIG. 11c depicts the time line of FIG. 11a with a time shift to synchronize with the time line of FIG. 11b.

FIG. 11d depicts the time line of FIG. 11b with a time shift to synchronize with the time line of FIG. 11a.

FIG. 12a depicts details of enabling avatars to emote, from a perspective of a local user (step 414 of FIG. 4).

FIG. 12b depicts details of enabling avatars to emote, from a perspective of a remote user (step 414 of FIG. 4).

FIG. 12c depicts details of controlling the display of a shared environment (step 414 of FIG. 4).

FIG. 13e depicts an example user interface which is provided when menu item 1324 in FIG. 13d is selected, to indicate that an invitation has been sent.

FIG. 13f depicts the example user interface of FIG. 13e updated to indicate that the invitation was accepted.

FIG. 17b depicts the user interface of FIG. 17a with a menu of available emoticons, based on selection of menu item 1532 in FIG. 17a.

DETAILED DESCRIPTION

Figure 1:
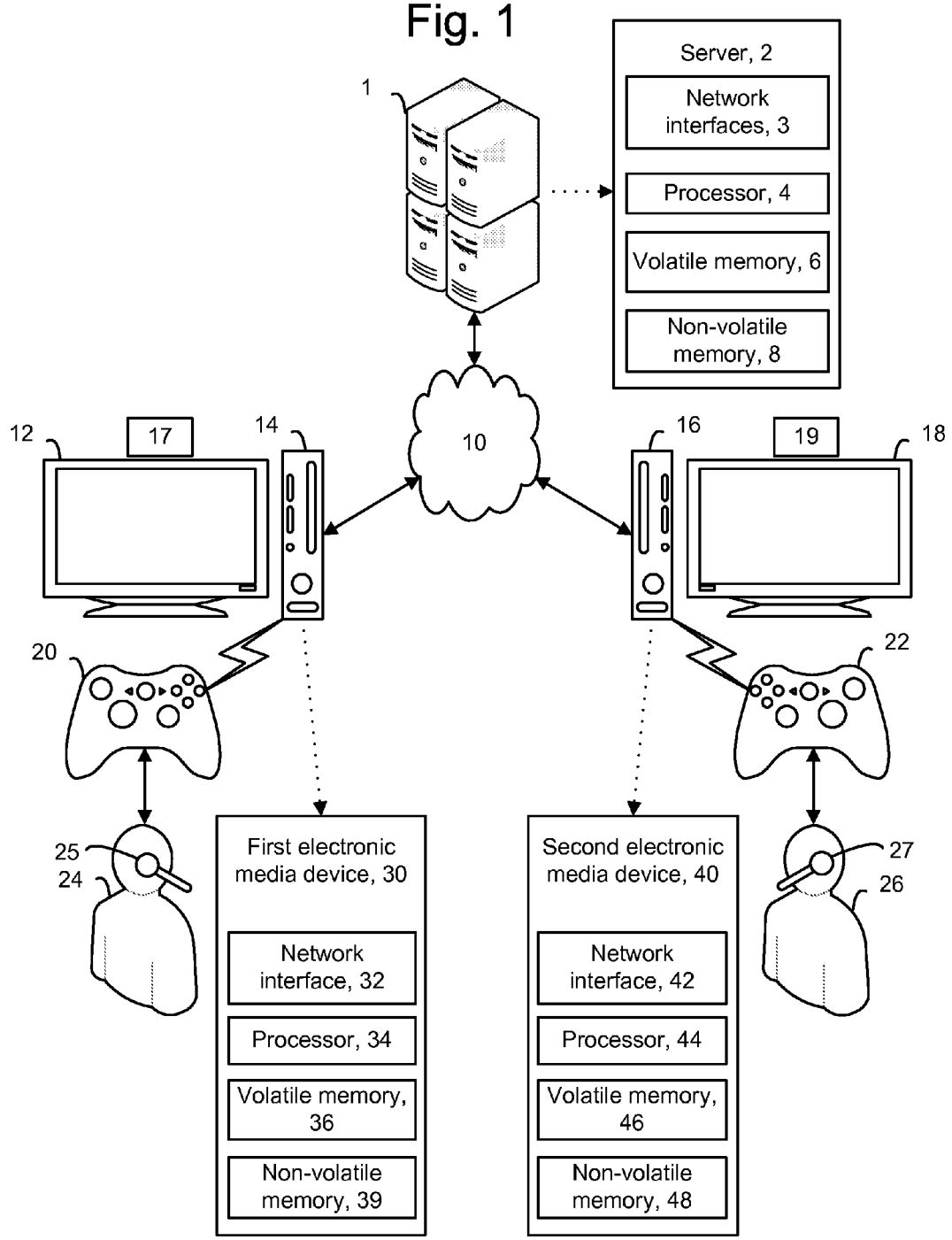
FIG. 1 depicts an example embodiment of a network which includes a streaming server and client electronic media devices.

Techniques are provided for allowing users to view common video content while interacting in a shared, virtual world environment. The video content can be a sports match, concert, movie, serial television program or other event. The interaction can be for various purposes, such as socializing among friends or family members, educational or training interactions among students or co-workers, and so forth. In the shared environment, the users interact by controlling respective avatars, and have the ability to move around and explore the shared environment from different camera angles. A voice and/or video chat channel can also be enabled to allow the users to speak to and see one another. The video content which is displayed via the electronic media devices of the respective users can be synchronized so that the users all see the same content at the same time. This makes the user's interactions more meaningful as they can react to the same portion of the video content in real time. Moreover, the users are able to interact while being in separate physical environments.

The techniques provided herein create an application utilizing network functionality that allows real-time multi-user interaction to watch and interact with video events. The ability to provide pre-event, during-event, and post-event rich interactive functionality allows users to engage in an experience with the application with real time updates provided. Users are provided with relevant and timely content feeds that enhance the experience of engaging with the application, by providing statistical and other information.

The solution begins to solve the problem of interactive engagement with friends and communities during video events. Previous platform solutions have provided content feeds in the form of video, statistics and other data information—but without any means to engage with friends in response to real time events as they happen, and without providing a common simulated viewing environment that can be shared, even though users may be in different physical locations.

A party mode functionality is used to enable the solution—specifically networked voice chat, visual representations in the form of avatars, the ability to control a set number of 'emotions' for avatars, enter and leave a party at will, and visualize what other members of the party are doing. The creation of a 2-D or 3-D landscape environment with the relevant video/data content either embedded or layered into this. Part of this environment includes the view of the user's personal avatar watching and interacting with other members of that party. Avatars are animated and customizable personal representations on the platform. Users have the ability to control 'emotions' on the avatars in response to real time events that happen during the application experience.

Pre-event, during-event, and post-event rich interactions can also be provided to allows the users to participate in real time quizzes/votes/predictions with either pre-determined or dynamic questions generated by the application.

FIG. 1 depicts an example embodiment of a network which include a streaming server and client electronic media devices. The network includes one or more servers 1, and one or more electronic media devices 14 and 16 such as game consoles having Internet connectivity or personal computers, connected via at least one network 10. The electronic media devices 14 and 16 can be provided at respective remote locations of users, such as homes, schools or offices. For example, a first electronic media device 14 may be associated with a television or other display device 12 which provides a user interface on which video content is displayed. A first user 24 can interact with a handheld controller 20 such as a game controller to provide control inputs to the first electronic media device 14. A second electronic media device 16 may be associated with a television or other display device 18 which provides a user interface on which video content is displayed. A second user 26 can interact with a handheld controller 22 to provide control inputs to the second electronic media device 16. As an alternative to the use of a handheld controller, a user could provide control inputs in other ways such as by voice command or by gesture recognition in a motion capture system.

In practice. a large number of electronic media devices can be in communication with the one or more servers 1 at the same time via a wide area network which extends over a large geographic area. The one or more servers 1 are depicted conceptually by a server block diagram 2, which includes network interfaces 3, one or more processors 4, volatile memory 6 and non-volatile memory 8. The volatile memory 6 and non-volatile memory 8 can be considered to be tangible computer readable storage having computer readable software embodied thereon for programming the one or more processors 4 to perform a method for providing an interactive and shared viewing experience. Further, the one or more processors 4 can provide a processor-implemented method for providing an interactive and shared viewing experience, comprising processor-implemented steps as described herein.

The first user's electronic media device 14 is depicted conceptually by a first electronic media device block diagram 30, which includes a network interface 32, one or more processors 34, volatile memory 36 and non-volatile memory 39. The volatile memory 36 and non-volatile memory 39 can be considered to be tangible computer readable storage having computer readable software embodied thereon for programming the one or more processors 34 to perform a method for providing an interactive and shared viewing experience. Further, the one or more processors 34 can provide a processor-implemented method for providing an interactive and shared viewing experience, comprising processor-implemented steps as described herein.

Similarly, the second user's electronic media device 16 is depicted conceptually by a second electronic media device block diagram 40, which includes a network interface 42, one or more processors 44, volatile memory 46 and non-volatile memory 48. The volatile memory 46 and non-volatile memory 48 can be considered to be tangible computer readable storage having computer readable software embodied thereon for programming the one or more processors 44 to perform a method for providing an interactive and shared viewing experience. Further, the one or more processors 44 can provide a processor-implemented method for providing an interactive and shared viewing experience, comprising processor-implemented steps as described herein.

Each user may have a headset 25, 27 which provides a talk and listen capability. A wireless voice link to the electronic media devices 14, 16 may be provided via Bluetooth (IEEE 802.15.1) transmissions, for instance. A voice chat capability can be provided among the users by digital communication of voice data between electronic media devices 14, 16 via the server 1 and the one or more networks 10. Furthermore, a video web chat capability can be provided among the users by digital communication of video image data between electronic media devices 14, 16 via the server 1 and the one or more networks 10, where the video image data is obtained from video cameras 17, 19 such as web cams. The video can be displayed in a picture-in-picture inset window on the user interface.

In some cases, the users pay a periodic subscription fee, or a per-use fee, to access streaming video content and other content from the one or more servers 1. The users may also play video games using the respective electronic media devices 14 and 16 and the game controllers 20, 22.

Figure 2:
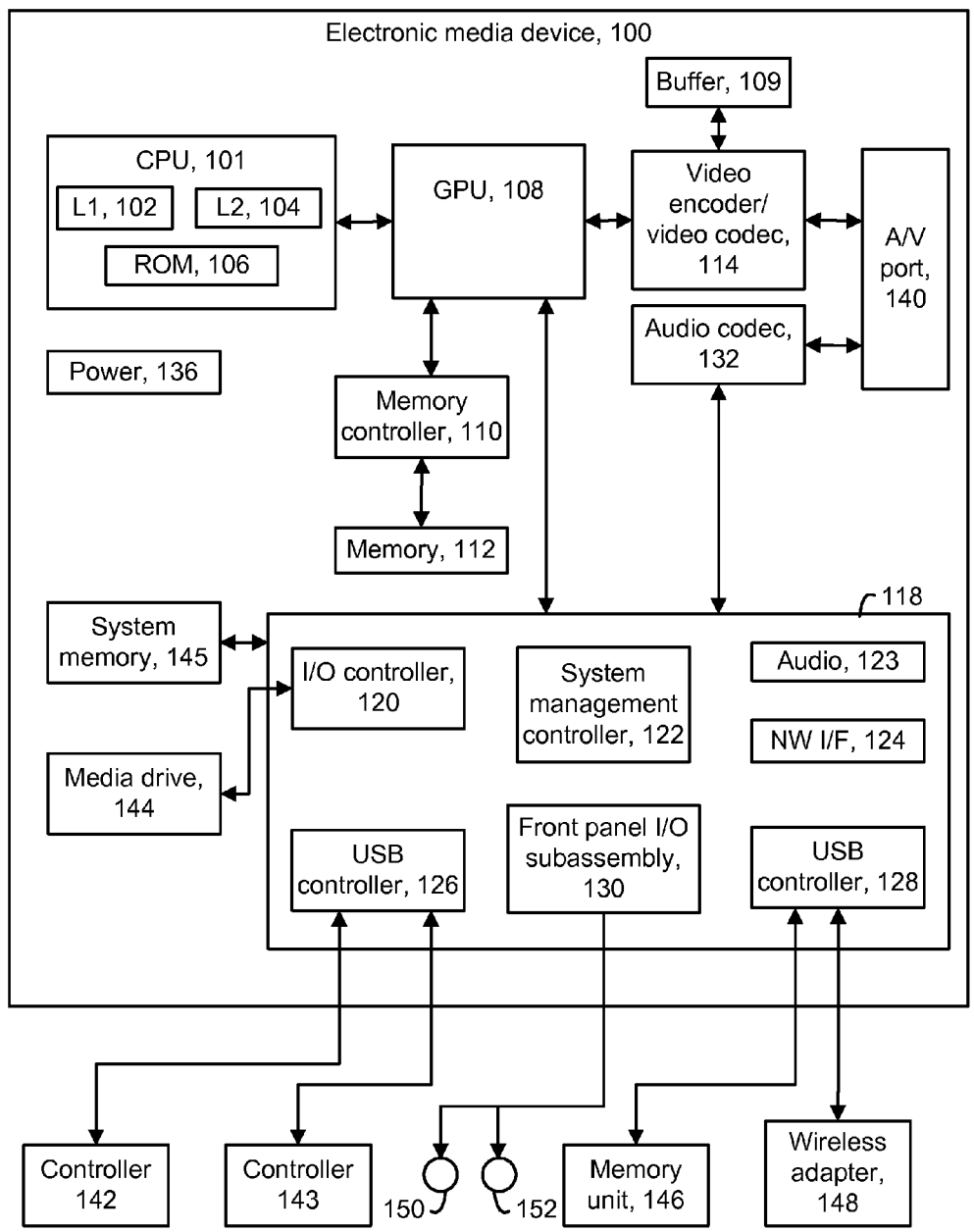
FIG. 2 depicts an example block diagram of a computing environment that may be used by the electronic media devices of FIG. 1.

FIG. 2 depicts an example block diagram of a computing environment that may be used by the electronic media devices of FIG. 1. The computing environment may include a electronic media device 100, such as a gaming console with Internet connectivity. A central processing unit (CPU) 101 has a level 1 (L1) cache 102, a level 2 (L2) cache 104, and a flash ROM (Read Only Memory) 106. The L1 cache 102 and L2 cache 104 temporarily store data and hence reduce the number of memory access cycles, thereby improving processing speed and throughput. The CPU 101 may have more than one core, and thus, additional level 1 and level 2 caches 102 and 104. The flash ROM 106 may store executable code that is loaded during an initial phase of a boot process when the electronic media device 100 is powered on.

A graphics processing unit (GPU) 108 and a video encoder/video codec (coder/decoder) 114 form a video processing pipeline for high speed and high resolution graphics processing. The coder/decoder 114 may access a buffer 109 for buffering frames of video. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The electronic media device 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142 and 143, such as the game controllers 20, 22 of FIG. 1, a wireless adapter 148, and an external memory unit 146 (e.g., flash memory, external CD/DVD ROM drive, removable media, etc.) The network interface (NW IF) 124 and/or wireless adapter 148 provide access to a network (e.g., the Internet, home network, etc.) and may include wired or wireless adapter components including an Ethernet card, a modem, a Bluetooth module, a cable modem, and the like.

System memory 145 is provided to store application data that is loaded during the boot process. A media drive 144 may comprise a DVD/CD drive, hard drive, or other removable media drive. The media drive 144 may be internal or external to the electronic media device 100. Application data may be accessed via the media drive 144 for execution, playback, etc. by the electronic media device 100. The media drive 144 is connected to the I/O controller 120 via a bus, such as a Serial ATA bus or other high speed connection.

The system management controller 122 provides a variety of service functions related to assuring availability of the electronic media device 100. The audio processing unit 123 and an audio codec 132 form an audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the electronic media device 100. A system power supply module 136 provides power to the components of the electronic media device 100.

The CPU 101, GPU 108, memory controller 110, and various other components within the electronic media device 100 are interconnected via one or more buses, including serial and parallel buses, a memory bus, a peripheral bus, and a processor or local bus using any of a variety of bus architectures.

When the electronic media device 100 is powered on, application data may be loaded from the system memory 145 into memory 112 and/or caches 102, 104 and executed on the CPU 101. The application may present a graphical user interface that provides a consistent user experience when navigating to different media types available on the electronic media device 100. In operation, applications and/or other media contained within the media drive 144 may be launched or played from the media drive 144 to provide additional functionalities to the electronic media device 100.

The electronic media device 100 may be operated as a standalone system by simply connecting the system to a television or other display. In this standalone mode, the electronic media device 100 allows one or more users to interact with the system, watch movies, or listen to music. However, with the integration of broadband connectivity made available through the network interface 124 or the wireless adapter 148, the electronic media device 100 may further be operated as a participant in a larger network community.

When the electronic media device 100 is powered on, a specified amount of hardware resources are reserved for system use by the electronic media device operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

After the electronic media device 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A electronic media device application manager controls the gaming application audio level (e.g., mute, attenuate) when system applications are active.

Input devices (e.g., controllers 142 and 143) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 3:
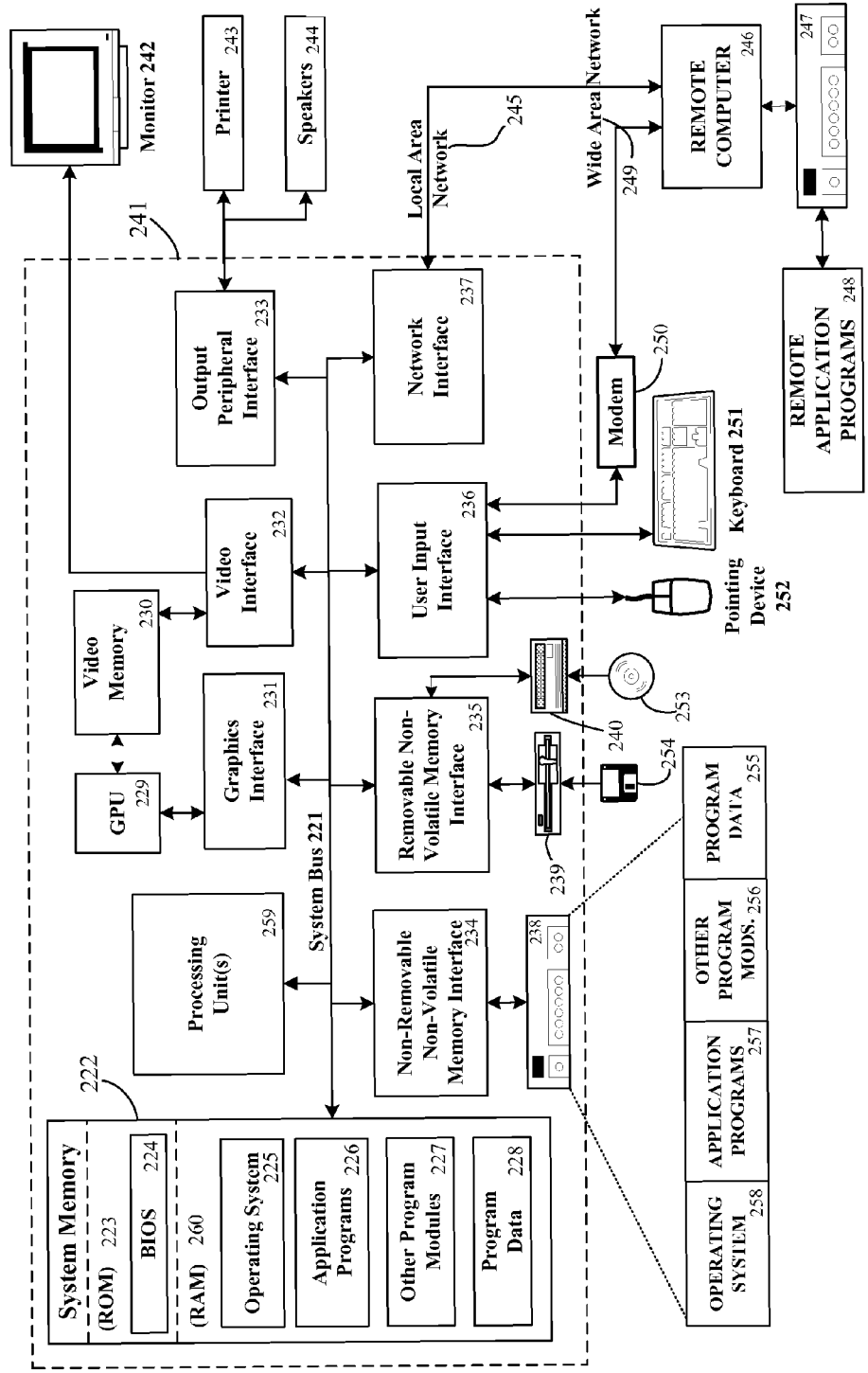
FIG. 3 depicts another example block diagram of a computing environment that may be used by the electronic media devices or server of FIG. 1.

FIG. 3 depicts another example block diagram of a computing environment that may be used by the electronic media devices or server of FIG. 1. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229 which in turn communicates with a video memory 230. The video memory 230 may include a buffer. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A depth camera system used for detecting gestures may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a PC, a server, a router, a network PC, a peer device or other common network node, and typically includes many or all of the elements described above relative to the computer 241, although only a memory storage device 247 has been depicted. The logical connections include a local area network (LAN) 245 and a wide area network (WAN) 249, but may also include other networks. Such networking environments are commonplace in home networks, offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. Remote application programs 248 may reside on memory device 247. It will be appreciated that the network connections shown are exemplary and other means of establishing a communications link between the computers may be used.

FIG. 4 depicts a method for providing a shared environment for viewing streamed video content. Note that in these and other flowcharts, the steps need not necessarily be performed discretely and in the order depicted. A user selects video content to view at step 400. The video content may include associated audio content as well. Moreover, the techniques described herein can be applied to audio-only content. Further details of step 400 are provided in connection with FIG. 5. Video content is streamed to the user at step 402. Further details of step 402 are provided in connection with FIG. 6. A user invites a friend to watch the video content in a shared environment at step 404. Further details of step 404 are provided in connection with FIG. 7. A shared environment is implemented at step 406, including displaying an avatar of the user. Further details of step 406 are provided in connection with FIG. 14a. The friend accepts the invitation at step 408. Further details of step 408 are provided in connection with FIG. 8. The friend's avatar is added to the shared environment at step 410. Further details of step 410 are provided in connection with FIG. 9. Display of the video content at the electronic media devices of the user and the friend is synchronized at step 412. Further details of step 412 are provided in connection with FIGS. 10 and 11a-11d. Step 414 enables avatar emotes and control of the display of the shared environment. Further details of step 414 are provided in connection with FIGS. 12a-12c.

FIG. 5 depicts details of a user selecting video content (step 400 of FIG. 4). At step 500, the user accesses a program guide. Further details of step 500 are provided in connection with FIG. 13g. At step 502, the user selects video content using the program guide. Other approaches for selecting video content can be used as well, such as entering a channel number, or a channel up or channel down command via the handheld controller. At step 504, an identification of the video content is sent from the user's electronic media device to a server, based on privacy and group settings of the user. In this way, the server is apprised of the video content which is currently being viewed by a user. Based on one or more predefined groups that the user has joined, and permissions the user has given, the user's viewing habits can be shared with a group of one or more other selected users, e.g., friends. This allows the server to determine when two members of a group are viewing the same content, and to send messages to the users informing them of this fact. Or, a user can query the server to determine whether any friends are currently online and what they are watching, or more generally, what applications, such as games, are currently running on their respective electronic media devices.

FIG. 6 depicts details of streaming video content to a user (step 402 of FIG. 4). Streaming of video content generally refers to transmitting the content over a scheduled time period in which the content is received, decoded and displayed by an electronic media device. Generally, the content is processed using temporary storage in the electronic media device, without saving the content to a hard disk. With live streaming (true streaming), different users who wish to view the content establish a respective connection with a server which streams the content during the scheduled time period. In contrast, with on demand streaming (progressive streaming), the content is saved to a hard disk and then is played at a desired time from that hard disk, rather than being played in a scheduled time period which is set by the server. Live streaming has the advantage that the server can multicast the content to a large number of users concurrently, minimizing bandwidth requirements.

At step 600, the electronic media device joins an Internet Protocol (IP) multicast group, in one example implementation. A common form of multicasting is IP multicasting, which is often used for streaming media and Internet television applications. IP multicasting provides one-to-many communication over an IP infrastructure in a network. It scales to a larger receiver population by not requiring prior knowledge of who or how many receivers there are. Multicast uses network infrastructure efficiently by requiring the source to send a packet only once, even if it needs to be delivered to a large number of receivers. The nodes in the network take care of replicating the packet to reach multiple receivers only when necessary. The most common low-level protocol to use multicast addressing is the User Datagram Protocol (UDP).

An IP multicast group address is used by the server to send the video content, and by the electronic media device to receive the video content. The server uses the group address as the IP destination address in the data packets of the video content. The electronic media device use the group IP address to inform the network that they are interested in receiving packets sent to that group IP address. The electronic media device can join a group using the Internet Group Management Protocol (IGMP).

At step 602, the server multicasts video content to the IP multicast group in a compressed form. Various video/audio compression and transmission protocols are known, such as the MPEG-2 protocol. Compressed video generally includes key frames, which are encoded without reference to another frame, along with predictive-coded frames, which are encoded with reference to one or more other frames. MPEG-2 uses intra-coded frames (I-frames) as key frames, and P- and B-frames as predictive coded frames. For example, the video stream may includes successive sequences which each start with a key frame followed by a number of predictive coded frames. Such a sequence may correspond to a group of pictures (GOP) in MPEG-2, for instance. Typically, one key frame may be provided followed by several seconds of predictive coded frames. At step 604, the electronic media device receives and buffers the frames. Small variations in the rate at which the video content is received at the electronic media device, relative to the display rate of the video content, can be accommodated using buffering. See, e.g., the buffers discussed in connection with FIGS. 2 and 3. For example, if the video content is received a little faster than the display rate in a certain time interval, the extra frames can be accumulated in the buffer, based on a size limit of the buffer. If the video content is received a little slower than the display rate in a later time interval, the display rate can be kept constant as the previously-stored frames are removed from the buffer. However, if the video content is received at a rate which is slower than the display rate for too long, the buffer will empty and the display will be interrupted.

At step 606, the electronic media device begins decoding and displaying frames, starting from a key frame. In some cases, there can be a noticeable delay, e.g., a few seconds, to the user between when the video content is selected and when it is displayed. The user interface can present a visual or audible transition during the delay, such as a channel/station identification.

FIG. 7 depicts details of a user inviting a friend to watch video content in a shared environment (step 404 of FIG. 4). At step 700, the user receives a message from a server indicating that a friend is watching the same video content. The server may provide this information based on an information gathering step which is performed for each user such as discussed in connection with at step 504 of FIG. 5. The server may determine whether one or more friends are watching the same video content as a subject user at the time the video content is first selected by the subject user, as well as at other times thereafter, such as when a friend tunes into the video content after the subject user has started viewing the video content. See FIG. 13b for further details.

At step 702, the user views all online friends and their activities, such as by entering a command via a user interface. See FIG. 13d for further details. Or, the user can choose to view only the friends who are watching the same video content. See FIG. 13c for further details. At step 704, the user issues a command to invite a friend to watch the video content in a shared environment. The command can include an identifier of the video content and an identifier of the friend. At step 706, the user's electronic media device communicates the invitation to the friend's electronic media device via a server for instance. The electronic media devices could also communicate via a network channel that does not include a server which is involved in streaming the video content or in managing the group of user. At step 708, the user interface displays the video content is a shared environment with an avatar of the user. See FIG. 14a for further details.

Note that a situation could potentially arise in which multiple users concurrently invite each other to view video content in a shared environment. In one approach, the invitations can be sent when they are requested by the users, and whichever invitation is accepted first governs which user is the host of the shared environment and which is the guest. Potentially, different capabilities could be provided for the host and guest roles. Or, the server can arbitrate the situation such as by causing a user to automatically join a shared environment when a sent invitation and a received invitation of the user are both pending concurrently. Or, the server could delay the delivery of an invitation and/or acceptance for a predetermined period of time when multiple users concurrently invite each other to view video content.

Optionally, the electronic media devices can communicate directly with one another via network connections to exchange the information needed to join the shared experience, without being managed by a server.

FIG. 8 depicts details of a friend accepting an invitation to watch video content in a shared environment (step 408 of FIG. 4). At step 800, one or more friend's respective electronic media devices receive an invitation from the server, or from the inviting user's device directly via some other network channel. At step 802, a friend's electronic media device displays a message regarding the invitation. See FIG. 15a for further details. At step 804, the friend accepts the invitation. At step 806, the friend's electronic media device sends an acceptance to the user's electronic media device via the server, for instance. At step 808, the user's electronic media device receives the acceptance. At step 810, the user interface informs the user of the acceptance. See FIG. 14b for further details.

FIG. 9 depicts details of adding a friend's avatar to a shared environment (step 410 of FIG. 4). At step 900, a friend's electronic media device sends avatar data to the user's electronic media device via the server or directly. This can include data regarding an appearance and other characteristics of the avatar, for instance. At step 902, the user's electronic media device receives the avatar data of the friend. At step 904, the user interface adds the avatar to the shared environment, based on the received avatar data. In some cases, such as for friends who frequently view content together in the shared environment, the avatar data of the friend can be stored at the user's electronic media device so that it does not need to be retransmitted to the user's electronic media device each time the friend joins in. The server could check the avatar data of the user or friend each time they view content together in the shared environment to determine if the avatar data has changed, e.g., due to an update to the appearance which was made by the user or friend. If the avatar data of the user has changed, it can be sent to the friend. Similarly, if the avatar data of the friend has changed, it can be sent to the user. The avatar data could also be stored at the server and provided to the electronic media devices as needed.

Figure 10A:
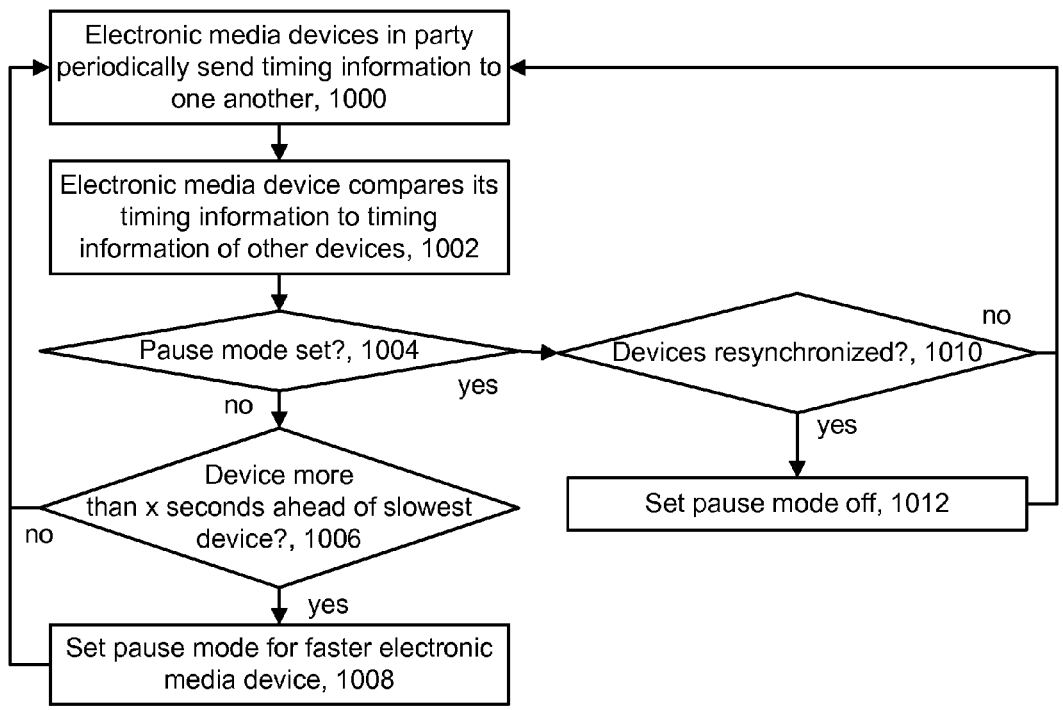
FIG. 10a depicts details of synchronizing display of video content (step 412 of FIG. 4).

FIG. 10a depicts details of synchronizing display of video content (step 412 of FIG. 4). As mentioned, compressed video content typically include key frames separated by a number of predictive-coded frames, and a key frame is typically accessed to begin displaying video content. Due to variations in a network, and due to the different times that users tune in to access video content, different electronic media devices will often access a video stream using different key frames in an unsynchronized manner. Such lack of synchronization can impair the experience of the shared environment, since the users will see different portions of the video content at a given instant. For example, imagine the confusion if a live sports match is being streamed in a shared environment, where one user sees a goal scored and begins cheering while the friend has not yet seen the goal being scored.

Different approaches to synchronization are possible. In an example implementation, at step 1000, all of the electronic media devices which join a party periodically send timing information to one another, in a peer-to-peer synchronization approach. This approach dynamically responds to changing network conditions. The period for sending the information can be every second, for instance, or every several seconds, e.g., every five seconds. The period can be fixed or varying. The electronic media devices may establish network connections with one another for this purpose. The timing information can include an identification of a most recent key frame which was displayed or received, or a time since a start of the video content, e.g., since a beginning of the content regardless of when the electronic media device began accessing the content, to a server. This sending of information may be triggered by an acceptance of the friend to join the shared experience. The timing information can include a presentation time stamp which identifies a key frame. Such timing information is generally available when the video content is being tuned. For example, video frames of the video content may have time stamps which indicate the elapsed time since the start of the content, e.g., 41 minutes and 32 seconds have elapsed in the video content. Also, key frames may have sequential identifiers which indicate, e.g., this is key frame #501 in the video content.

At step 1002, each electronic media device compares its timing information to the receiving timing information from the other electronic media devices. For example, a device can compare its most recent time stamp to one or more received time stamps to determine respective time differences. A given electronic media device may be faster than another electronic media device if the given electronic media device has already displayed a frame which the another electronic media device has not yet displayed. Similarly, a given electronic media device may be slower than another electronic media device if the given electronic media device has not yet displayed a frame which the another electronic media device has already displayed. Step 1002 determines an amount by which the electronic media device is unsynchronized with other devices.

At decision step 1004, if a pause mode, discussed below in connection with step 1008, has not been set, decision step 1006 determines if the electronic media device is more than a specified interval of x seconds, such as two seconds, ahead of a slowest of the other electronic media devices. For instance, assume a given device is electronic media device A, and there are two other devices in the party, electronic media devices B and C. Assume device A has a most recent time stamp of 40 minutes and 0 seconds, device B has a most recent time stamp of 40 minutes and 1 seconds, and device C has a most recent time stamp of 39 minutes and 57 seconds. Then, device A is one second slower than device B and three seconds faster than device C. Device A is more than two seconds ahead of the slowest device, device C.

In this case, step 1008 sets a pause mode for the fastest electronic media device, device A, and processing continues at 1000 with receipt of the next timing information at device A from devices B and C. In the pause mode, the display of the paused device can continue to depict the avatars and the virtual world even though the video content is paused. In place of the video content, a message can be provided indicating that a synchronization process is taking place. Or, the last video frame before the pause can be displayed during the pause. In one approach, the user interface can automatically transition to a specified camera angle during the pause mode. Also, the user interface can automatically transition from a full screen mode in which the virtual world is not depicted to a mode in which the virtual world is depicted, and the video content is not depicted at all or is depicted in a less prominent manner.

With the pause mode set, decision step 1004 is now true. Decision step 1010 determines whether the devices have been resynchronized, that is whether the given device, device A, and the slowest device, device C have been resynchronized. A tolerance can be imposed so that step 1010 is true if device A is less than y<x seconds ahead of the slowest device. Or, step 1010 can be true if device A is no longer ahead of the slowest device. In other words, the formerly slowest device becomes even with or ahead of device A. If decision step 1010 is false, and resynchronization has not yet been achieved, step 1000 is performed. If decision step 1010 is true, synchronicity has been achieved and the pause mode is set off at step 1012. In synchronicity, the same video content is displayed at substantially the same time (or at least within the tolerance x seconds) across multiple electronic media devices.

In this example, the electronic media devices communicate with one another to maintain synchronicity without intervention of a managing server. However, it is also possible to use a managing server for this task. For example, the server could determine when a faster device is more than x seconds ahead of a slower device and issue a command to the faster device to enter the pause mode.

Also, note that a pause mode can be set for more than one faster device concurrently. Different pause periods for different devices can be implemented.

In FIG. 10*a*, the period for the devices to exchange timing information should be less than the period x in step 1006 to avoid implementing a delay that is too long, causing the faster device to become the slower device.

Figure 10B:
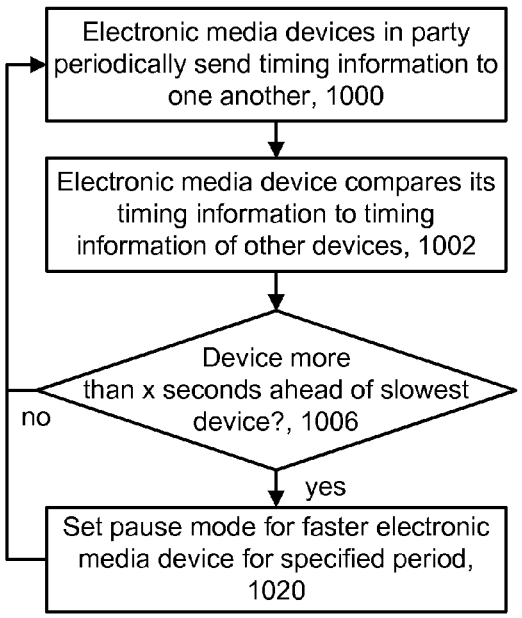
FIG. 10b depicts details of another technique for synchronizing display of video content (step 412 of FIG. 4).

FIG. 10*b* depicts details of another technique for synchronizing display of video content (step 412 of FIG. 4). Steps 1000, 1002 and 1006 are the same as in FIG. 10*b*. Step 1020 sets a pause mode for a specified period of time based on the time difference between the given device and the slowest device. For instance, the period for the pause mode can be the same as the time difference. In this example, the period for the devices to exchange timing information can be more than the period x in step 1006 since the pause mode is limited, e.g., to x seconds.

Generally, one electronic media device can be synchronized with another, or both can be synchronized to some other reference, such as a reference which is maintained by a server. Three or more electronic media devices can be synchronized together as well. In one approach, the electronic media devices which are early can be synchronized with the electronic media device which is the latest. In another approach, the electronic media devices which are late can be synchronized with the electronic media device which is the earliest. In another approach, the later and earlier electronic media devices can be synchronized with an electronic media device whose timing is intermediate to the others.

FIG. 11*a* depicts a time line 1000 of a first electronic media device, whose timing is early. KF(0), KF(1), KF(2), . . . , KF(i−1), KF(i), KF(i+1), . . . represent successive key frames (KFs) which are displayed at time points t0, t1, t2, t(i−1), t(i), t(i+1), . . . , respectively.

FIG. 11*b* depicts a time line 1110 of a second electronic media device, whose timing is late. The same key frames as in FIG. 11*a* are displayed but at respective times which are later by a time period Δ1. Specifically, KF(0), KF(1), KF(2), . . . , KF(i−1), KF(i), KF(i+1), . . . are displayed at time points t0', t1', t2', t(i−1)', t(i)', t(i+1)', . . . , respectively. Here, the first electronic media device is faster than the second electronic media device by a time period Δ1.

FIG. 11*c* depicts the time line of FIG. 11*a* with a time shift to synchronize with the time line of FIG. 11*b*. In the time line 1120, KF(i) is delayed by Δ1 so that it is displayed in synchronicity with KF(i) in time line 1110. This can be achieved by pausing the first electronic media device as discussed in connection with FIGS. 10*a* and 10*b*. The subsequent frames, such as KF(i+1) will similarly be in synchronicity with time line 1110. This represents synchronizing the faster electronic media device with the slower electronic media device.

FIG. 11*d* depicts the time line of FIG. 11*b* with a time shift to synchronize with the time line of FIG. 11*a*. In the time line 1130, KF(i+1) is moved up by Δ2 so that it is displayed in synchronicity with KF(i+1) in time line 1100. The subsequent frames will similarly be in synchronicity with time line 1100. This represents synchronizing the slower media device with the faster electronic media device.

Synchronizing to the slower electronic media device is possible in all cases since it involves a delay of the output display, for video content that is already at the faster electronic media device. Synchronizing to the faster electronic media device is possible when the video content which is jumped ahead to is already at the slower electronic media device, such as in a buffer.

FIG. 12a depicts details of enabling avatars to emote, from a perspective of a local user (step 414 of FIG. 4). At step 1200, a user accesses an on-screen menu for emotes. Emotes are actions that an avatar can perform, such as clapping the hands together, e.g., applauding, waving, cheering by standing up with arms overhead, crossing the arms, showing fear by covering the eyes, bowing, blowing a kiss, showing anger by shaking one's fist, pointing a finger, acting disinterested by sleeping, and so forth. The actions can be accompanied by audio. See FIGS. 17b-17e for further details. At step 1202, the user selects an emote. At step 1204, the electronic media device processes the selection to control actions of the user's avatar in the shared environment. Since the environment is shared with others, the avatar's actions will be seen by all users.

FIG. 12b depicts details of enabling avatars to emote, from a perspective of a remote user or friend (step 414 of FIG. 4). Here, the friend is remote from the user discussed in connection with FIG. 12a. At step 1210, the friend accesses a menu for emotes. At step 1212, the friend selects an emote. At step 1214, the friend's electronic media device sends a message regarding the emote to the user's electronic media device via a server or directly, without being managed by the server. At step 1216, the user's electronic media device processes the message to control the action of the friend's avatar in the shared environment. A number of other control actions of other respective avatars from friends can also be received and processed by the user's electronic media device.

FIG. 12c depicts details of controlling the display of a shared environment (step 414 of FIG. 4). Generally, each user can have the ability to view the shared environment as a virtual world from different camera angles. In one approach, each user can control the view independently. This provides the ability to explore the shared environment from different viewpoints. For example, a shared environment may be a sports stadium in which the video content is a sports match. The user may have the ability to view other fans in the stands, a playing field and so forth. In another example, the shared environment is a living room of a home, and the user may have the ability to view different portions of the living room or home, including furniture and decor.

At step 1220, the user provides a command to view the shared environment from a different camera angle. An initial, default camera angle may be used when the shared environment is first entered. At step 1222, the user's electronic media device processes the command to change a rendering of the shared environment. Step 1224 includes rendering the shared environment, avatars and video content from a different camera angle, including repositioning the video content so that it remains visible. This repositioning is demonstrated, e.g., in the different camera angles of FIG. 16 to FIG. 17a.

Figure 13A:
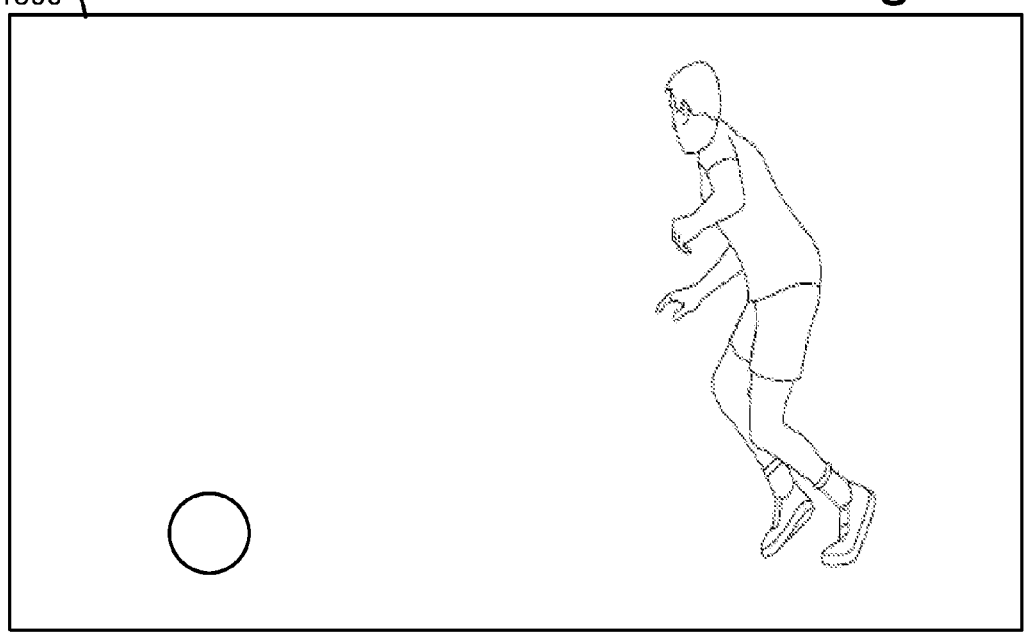
FIG. 13a depicts an example user interface which provides video content before a shared environment is started.

FIG. 13a depicts an example user interface 1300 which provides video content before a shared environment is started. As an example, a soccer player and a soccer ball are depicted. The video content may consume the entire display region.

Figure 13B:
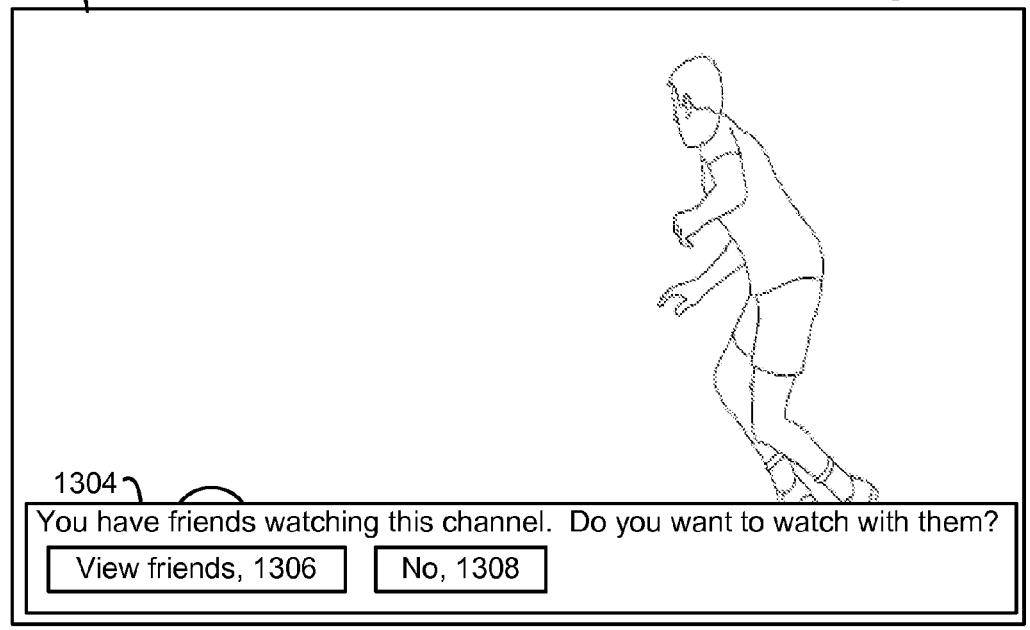
FIG. 13b depicts the example user interface of FIG. 13a with a message displayed to indicate that a friend is watching the same video content.

FIG. 13b depicts the example user interface of FIG. 13a with a message displayed to indicate that a friend is watching the same video content. In the user interface 1302, a message region 1304 informs the user: "You have friends watching this channel. Do you want to watch with them?" Further, a menu item 1306 ("View friends") can be selected to view more information regarding the friends, and a menu item 1308 ("No") can be selected to deny the request and to return to the user interface 1300.

Figure 13C:
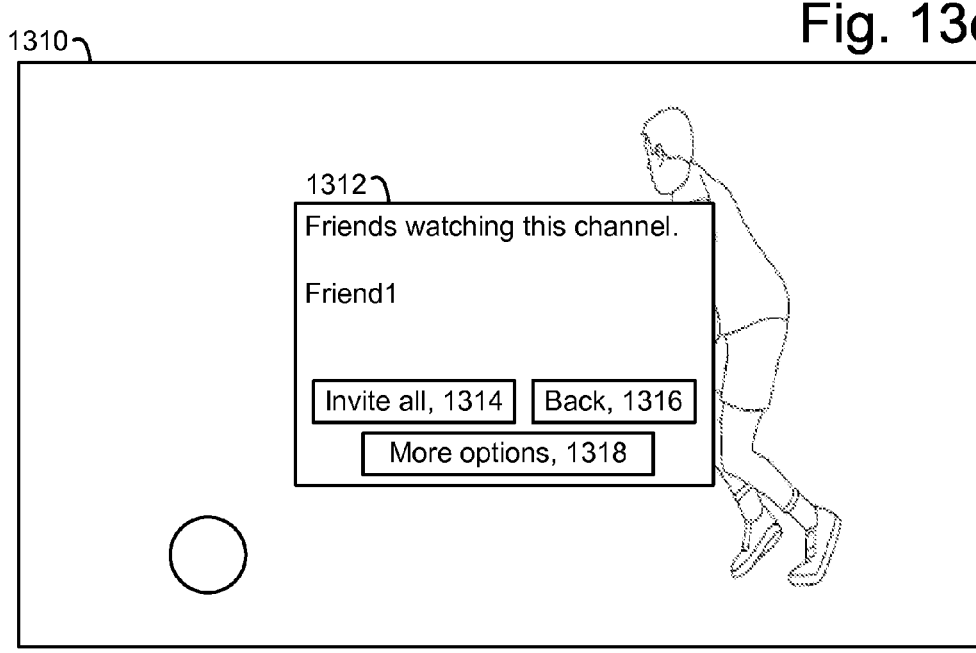
FIG. 13c depicts an example user interface which is provided when menu item 1306 in FIG. 13b is selected.

FIG. 13c depicts an example user interface 1310 which is provided when menu item 1306 in FIG. 13b is selected. A display region 1312 identifies the friends that are watching the channel, e.g., the video content. The identifier "Friend1" is provided. The electronic media device may provide other information regarding the friend such as a photo and personal information, if available. A menu item 1314 ("Invite all") can be selected to invite all friends who are watching the video content to join in a shared environment. A menu item 1316 ("Back") can be selected to return to the previous user interface. A menu item 1318 ("More options") can be selected to view additional options, such as to identify other friends who are currently online but not viewing the same video content.

Figure 13D:
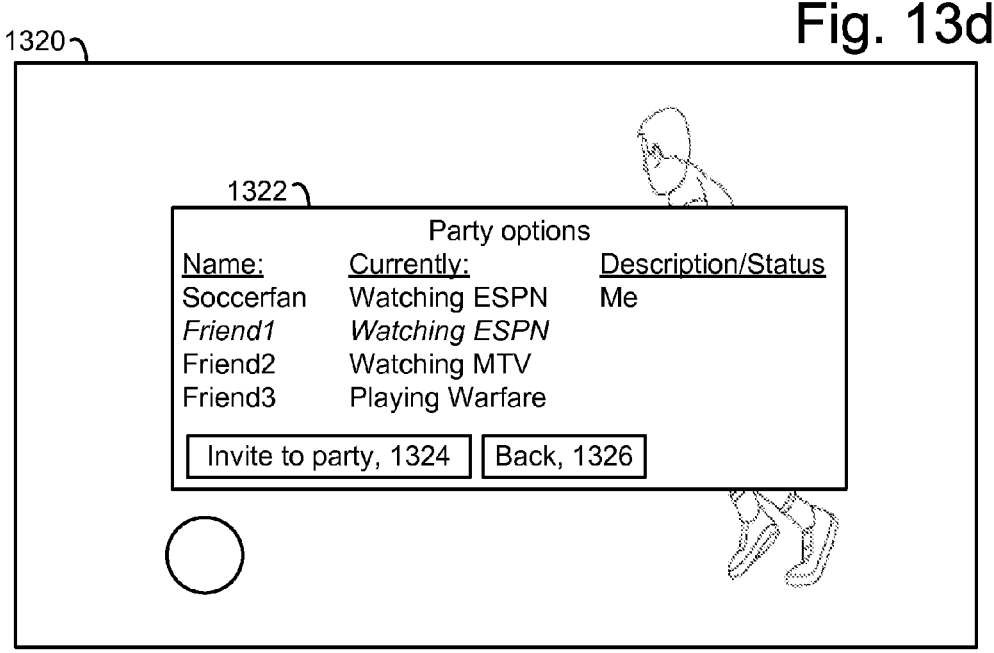
FIG. 13d depicts an example user interface which is provided when menu item 1318 in FIG. 13c is selected.

FIG. 13d depicts an example user interface 1320 which is provided when menu item 1318 in FIG. 13c is selected. The display region 1322 provides "Party options" by listing the user and three friends of the user who are currently online under "Name," their current activity under "Currently" and a "Description/Status." For example, "Soccerfan" is the nickname of the subject user, and that user is currently "Watching ESPN," a sports channel. Friend1 is also currently "Watching ESPN." Friend2 is "Watching MTV" (another channel). Friend3 is currently "Playing Warfare," a video game. A menu item 1324 ("Invite to party") can be selected to invite one or more of the friends to the shared viewing environment. The user can select specific ones of the friends to invite such as by operating a handheld controller to highlight and select one or more names of the friends. In the example, "Friend1" is highlighted. A menu item 1326 ("Back") can be selected to return to the previous user interface.

FIG. 13e depicts an example user interface 1330 which is provided when menu item 1324 in FIG. 13d is selected, to indicate that an invitation has been sent. The display region 1332 indicates "Invitation sent" for Friend1.

FIG. 13f depicts the example user interface of FIG. 13e updated to indicate that the invitation was accepted. In the user interface 1340, a display region 1342 indicates "In my party" for Friend1 since Friend1 has accepted the invitation and is therefore now in the party, or shared viewing experience.

Figures 13G, 14A:
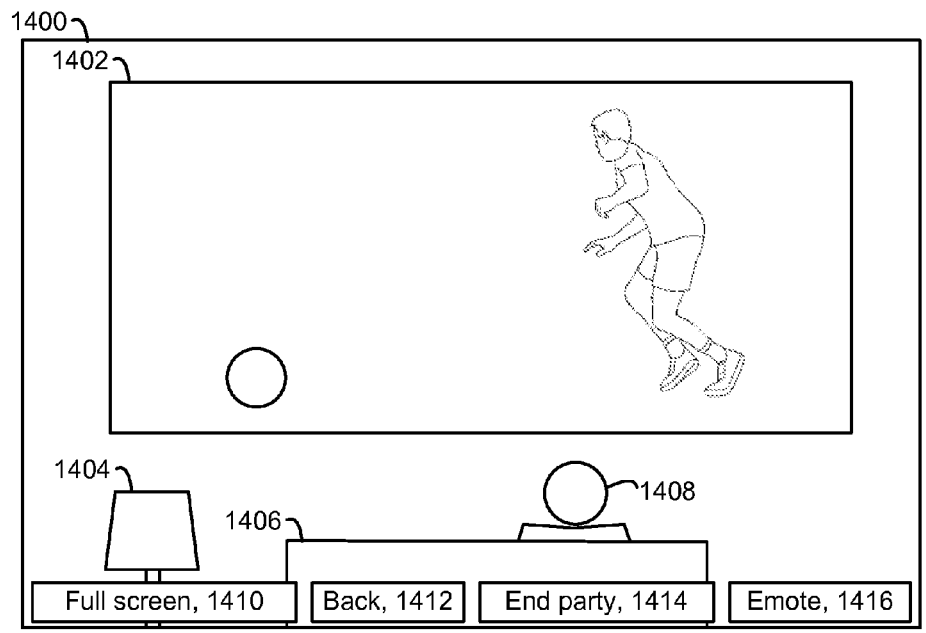
FIG. 13g depicts an example of a user interface by which a user can invite a friend to watch a program.
FIG. 14a depicts an example user interface having the video content of FIG. 13a in a shared environment, from a perspective of a first user, where an avatar of the first user is present.

FIG. 13g depicts an example of a user interface by which a user can invite a friend to watch a program. The user interface 1350 provides an electronic program guide (EPG), such as on a TV screen or a PC monitor/display screen, based on EPG data which is downloaded from a server from time to time. The EPG uses a two-dimensional grid to display program content, where one axis denotes the channel and another axis denotes the time axis. Multiple channels are displayed along the channel axis and multiple time periods are displayed along the time axis. A user navigates the EPG to find the desired content using a remote control device, a mouse or other pointing device. Other possible EPG interfaces include a touch interface which the user can touch, an interface in which the user uses sweeping gestures to navigate, voice navigation and web-cam navigation which observes hand/arm movements, and other styles of pointing devices, such as analog pressure sensitive rocker buttons. Navigation could also involve using a joystick and various buttons on a video game handheld controller to make selections.

Here, the program entry 1352 ("Soccer") is highlighted by the user. The user can use a menu item 1354 ("Select") to select and begin viewing the content. A menu item 1356 ("Back") can be selected to return to the previous user interface. A menu item 1358 ("Watch with friends") can be selected to view the content in a shared environment. Selection of the menu item 1358 could lead to the user interface of FIG. 13c or 13d, for instance.

FIG. 14a depicts an example user interface having the video content of FIG. 13a in a shared environment, from a perspective of a first user, where an avatar of the first user is present. The user interface 1400 includes a shared environment with a number of elements. One element is a display region 1402 which provides the video content. In this view, the video is displayed from a flat, straight ahead perspective or camera angle. Other elements include scene elements such as furniture (e.g., lamp 1404 and couch 1406). Further, an avatar 1408 represents the user. The avatar 1408 is shown from behind in this view, sitting on the couch and watching the display region 1402. The user interface is shown in a simplified example. In practice, different colors, textures and graphics can be used to create an eye-catching scene which gives the user the feeling of being immersed in a virtual world while viewing the video content and interacting with one or more other avatars.

Various menu items can be selected by the user. These include menu item 1410 ("Full screen"), which can be selected to view the video content full screen, without the shared environment including the furniture and avatar. A menu item 1412 ("Back") can be selected to return to the previous user interface. A menu item 1414 ("End party") can be selected to end the shared environment and return to the user interface of FIG. 13a. A menu item 1416 ("Emote") can be selected to view a menu of emote options, such as shown in FIG. 17b. Note that the shared environment can be initiated even before a friend joins in, in one approach, and maintained after the video content is concluded. The shared environment can also be initiated before the video content is streamed, in which case all other features of the shared environment can be provided.

Optionally, an appearance and other characteristics of the shared environment can be set based on the video content. For example, the shared environment can be set based on information which is obtained from the video content. This can include, e.g., a rating or genre of the video content. Such information can be provided in specified data fields. For example, in MPEG-2, a rating_attribute field can indicate an age-based attribute for overall rating as well as for violence, language, sexual content, dialogue and fantasy violence. As an example, when video content is rated as being acceptable for viewing by children, the shared environment may be configured to have child-friendly themes, e.g., using bright colors, animated characters, toys and so forth in a setting such as a home, school or playground. Or, when the video content is rated as being acceptable for viewing only by adults, the shared environment may be more sophisticated. Demographic information of the user could also be used to select an appropriate shared environment. For example, the user may provide demographic information when registering with a service that provides the streamed video content. Demographic information could include gender, race, age, income, occupation and geographic location such as indicated by zip code.

In another approach, the title or other identifier of the video content is retrieved from the video content and cross-referenced in a database to a corresponding appropriate shared environment. Further, the shared environment could be set based on the channel of the video content. For example, for a channel which shows sports, the shared environment can have a corresponding sports theme, e.g., the avatars can sit in stadium seats or on the sidelines of a game field. For a channel which shows old movies from a specific time period, the shared environment may include a home, nightclub or other location with period details. For a channel which shows science fiction movies, the shared environment may include a futuristic theme. Many other alternatives are possible. Moreover, the user may have the ability to set colors and other visual themes for the shared environment based on a previously set profile or based on control inputs made via an appropriate user interface while viewing the video content.

In addition to the appearance of the shared environment, characteristics relating to how the avatars emote could also be set. For example, for emotes such as clapping or cheering, the way in which the emote is performed can be tailored a particular shared environment. Audio effects such as clapping or cheering volume can also be tailored a particular shared environment. It is also possible for different users to have different shared environments when watching the same video content. For instance, while two users may see their avatars sitting on a couch in the shared environment of a living room, the first user may see a couch of one color and style on the first user's user interface while the second user may see a couch of another color and style on the second user's user interface.

Figure 14B:
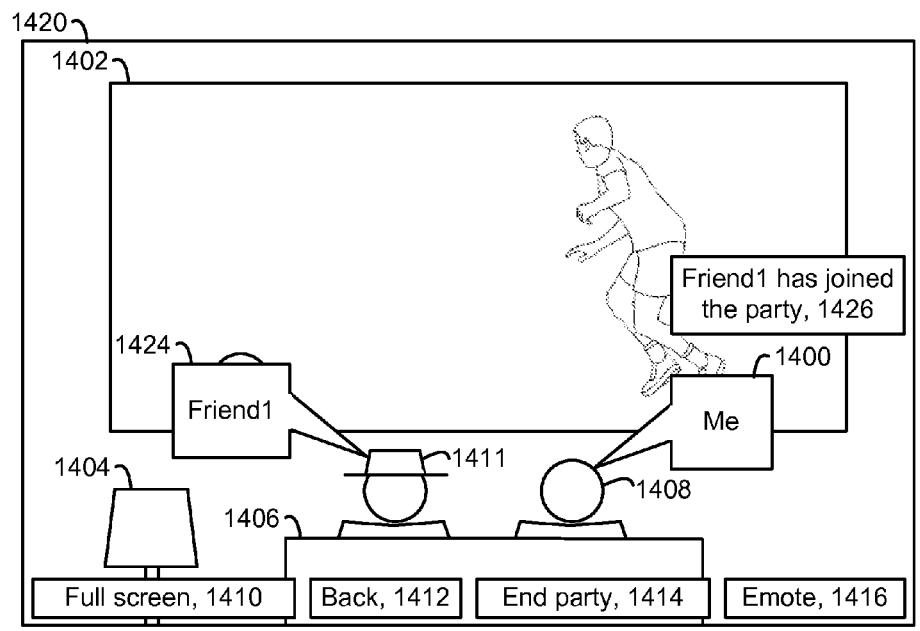
FIG. 14b depicts the example user interface of FIG. 14a after an avatar of a second user is added to a shared environment.

FIG. 14b depicts the example user interface of FIG. 14a after an avatar of a second user is added to a shared environment. In the user interface 1420, an avatar 1411 of a friend joins the virtual world. A message 1426 appears indicating that "Friend1 has joined the party." When a new avatar joins, each avatar may be identified by a callout. For example, callout 1424 identifies avatar 1411 as being Friend1, and callout 1400 identifies avatar 1408 as being "me," that is, the subject user.

Figure 15A:
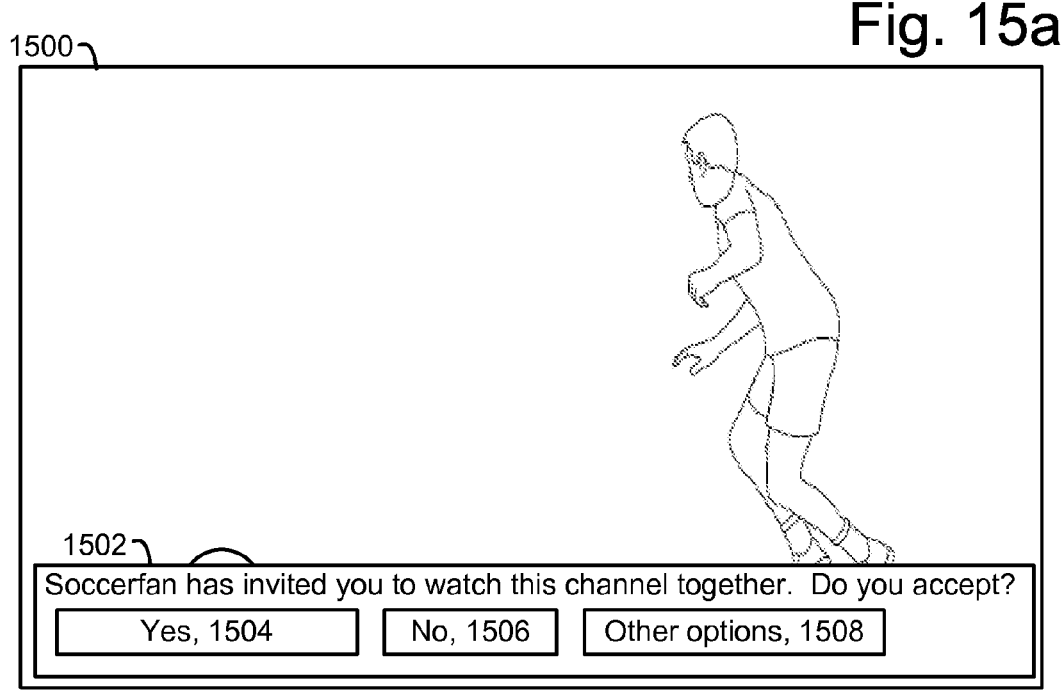
FIG. 15a depicts the example user interface of FIG. 13a with a message displayed to indicate that an invitation has been received to watch the same video content together.

FIG. 15a depicts the example user interface of FIG. 13a with a message displayed to indicate that an invitation has been received to watch the same video content together. The user interface 1500 represents what the invited friend will see when another users sends him or her an invitation. A message region 1502 informs the friend that "Soccerfan has invited you to watch this channel together. Do you accept?" A menu item 1504 ("Yes") can be selected to accept the invitation. A menu item 1506 ("No") can be selected to decline the invitation. A menu item 1508 ("Other options") can be selected to view other options, such as an interface similar to that of FIG. 13d.

Figure 15B:
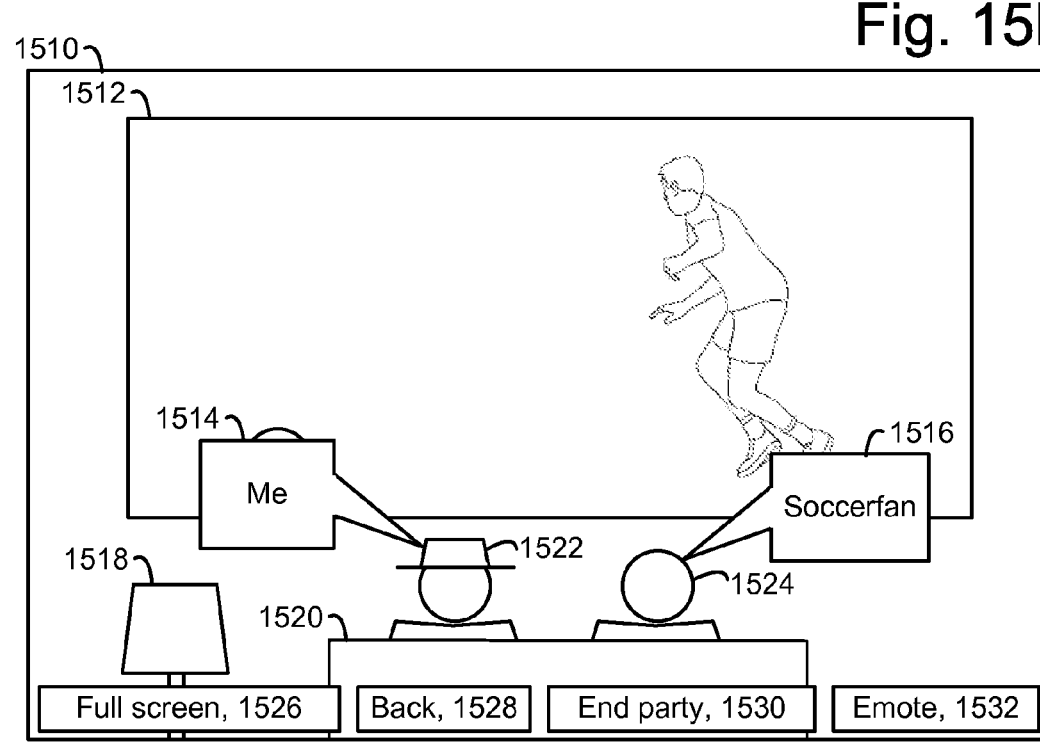
FIG. 15b depicts an example user interface having the video content of FIG. 13a in a shared environment, from a perspective of a second user, where avatars of first and second users are present.

FIG. 15b depicts an example user interface having the video content of FIG. 13a in a shared environment, from a perspective of a second user, where avatars of first and second users are present. The user interface 1510 includes the same shared environment as FIG. 14a. Included is display region 1512 which provides the video content (corresponding to region 1402 in FIG. 13a), lamp 1518 (corresponding to 1404) and couch 1520 (corresponding to 1406). Callout 1516 identifies the avatar 1524 as being Soccerfan, and callout 1514 identifies the avatar 1522 as being "Me," that is, the subject friend.

The various menu items 1526, 1528, 1530, 1532 correspond to menu items 1410, 1412, 1414, 1416, respectively, in FIG. 14a.

Figure 16:
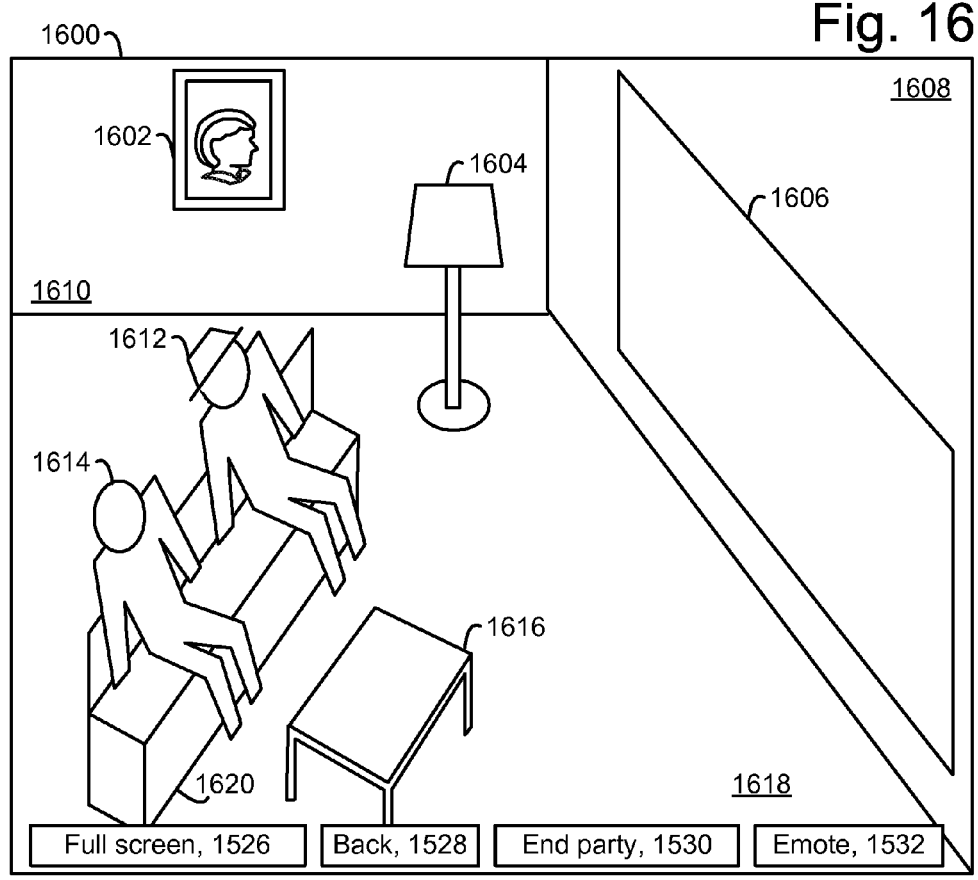
FIG. 16 depicts the shared environment of FIG. 14a from a different camera angle, showing distortion of a display area for video content.

FIG. 16 depicts the shared environment of FIG. 14a from a different camera angle, showing distortion of a display area for video content. To obtain this view, the user can actuate a handheld controller, for instance, to move around in the virtual world. For example, the controller can be actuated to gradually pan around the shared environment, which is a living room in this example. Pan, tilt, and zoom settings can be adjusted. The user interface 1600 includes a display region 1606 which is shown distorted in a perspective view. This distortion can increase the realism of the shared environment. The scene also includes a floor 1618, walls 1608 and 1610, a couch 1620, coffee table 1616, lamp 1604, and wall hanging art work 1602. The avatars, couch and lamp correspond to those in FIG. 14a. The avatars 1614 and 1612 correspond to the user and friend, respectively. Note that the avatar for the friend wears a hat in the different drawings. Again, the user interface is shown in a simplified example. In practice, greater depth and realism can be provided.

Figure 17A:
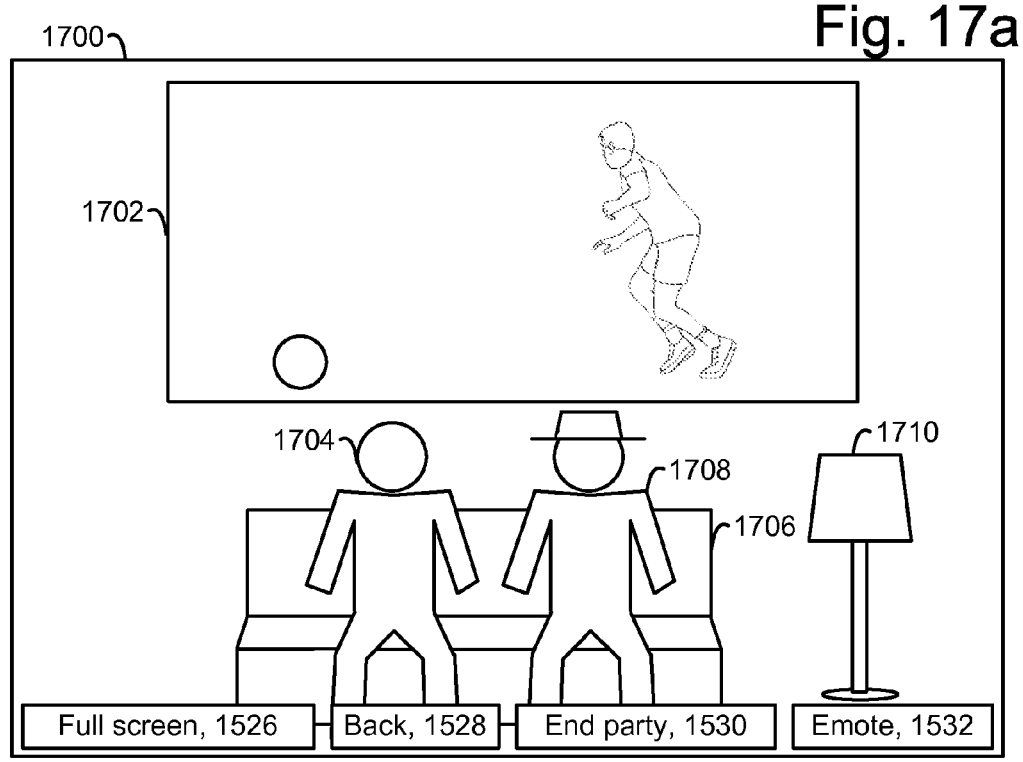
FIG. 17a depicts the shared environment of FIG. 14a from another different camera angle, showing movement of a display area for video content.
Figure 17B:
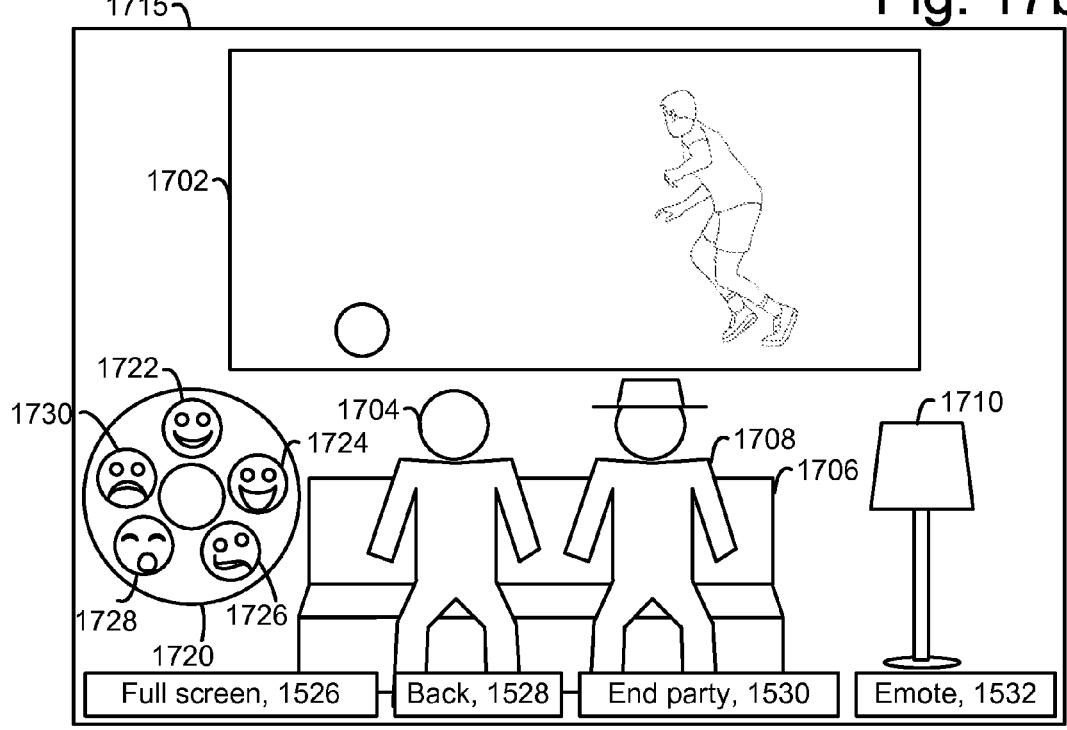

FIG. 17a depicts the shared environment of FIG. 14a from another different camera angle, showing movement of a display area for video content. The user may select a camera angle which depicts the avatars from the front, in which case the display area for the video content can move to behind the avatars, so that it is still visible to the user. The user interface 1700 includes a display region 1702, couch 1706, lamp 1710, user avatar 1704 and friend avatar 1708. The avatars are sitting passively in the shared environment at this time. The avatars, couch and lamp correspond to those in FIGS. 14a and 16.

FIG. 17b depicts the user interface of FIG. 17a with a menu of available emoticons, based on selection of menu item 1532 in FIG. 17a. The user selects the emote menu option to view a menu 1720 in user interface 1715 which provides a number of emote options as a plurality of selectable emoticons or icons concurrently on the user interface, where each icon represents a different action. In one approach, the icons are faces arranged in a circle, where each face expresses an emotional state and represents an action which is consistent with the emotional state. For example, an icon 1722 may represent happiness and an action of clapping the hands, an icon 1724 may represent jubilation and an action of standing and raising one's ands in the air above the head, an icon 1726 may represent being worried and an action of covering one's eyes with one's hands, icon 1728 may represent being board and an action of falling asleep, and icon 1730 may represent anger and an action of raising a clenched fist. Corresponding audio may be associated with each icon as well, for instance clapping (icon 1722), cheering or hooting (icon 1724), making a sound of dread such as "oh, no!" (icon 1726), yawning (icon 1728) and muttering or booing (icon 1730).

In another example, the emoticons include: (1) Wahey! —avatar celebrates, (2) Ha! Ha! (directed emote)—avatar points and laughs, (3) Clap—avatar claps hands such as in front of face, (4) Nooo! —avatar hides his face as he can't bear to watch, (5) Grrr! —avatar is angry, (6) #!*@! (directed emote)—avatar points and is angry, (7) Oi Ref! —avatar mimics 'carding', and (8) Big Wave—stadium style full body wave. Carding refers to a referee in a sports match holding up a colored card which indicates that a player has committed an offense. The avatar can similarly hold up a colored card. A wave typically occurs in a stadium setting where each spectator briefly stands and raises his or her arms overhead, slightly after the person immediately to either the right or left stands. Immediately upon stretching to full height, the spectator returns to the seated position. The avatars can similarly perform this action.

Figure 17C:
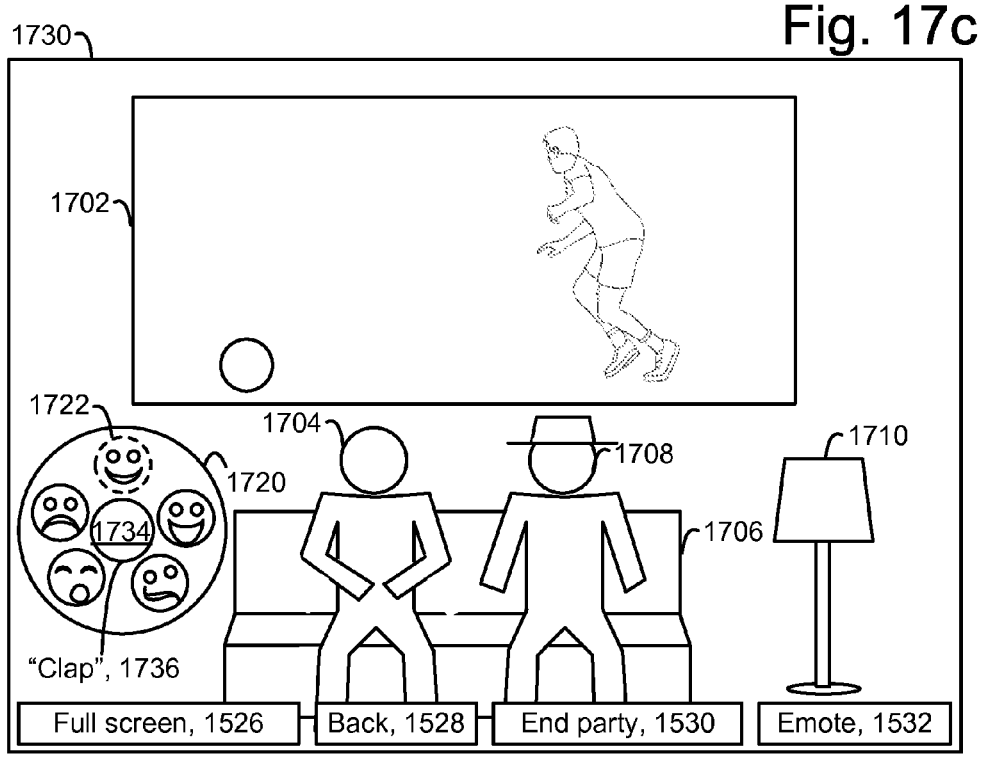
FIG. 17c depicts the user interface of FIG. 17b after one of the emoticons is selected, showing emoting of a first avatar by clapping.

FIG. 17c depicts the user interface of FIG. 17b after one of the emoticons is selected, showing emoting of a first avatar by clapping. When icon 1722 is selected, the user's avatar 1704 begins clapping, as indicated by the arms/hand coming together in the user interface 1730. Further, the menu can include a textual description of each emoticon that corresponds to the currently selected icon. The textual description may appear in a center region 1734 of the menu 1720. For example, the textual description "Clap" 1736 can appear when the icon 1722 is selected, as indicated by the dashed lines at the border of the icon 1722.

Figure 17D:
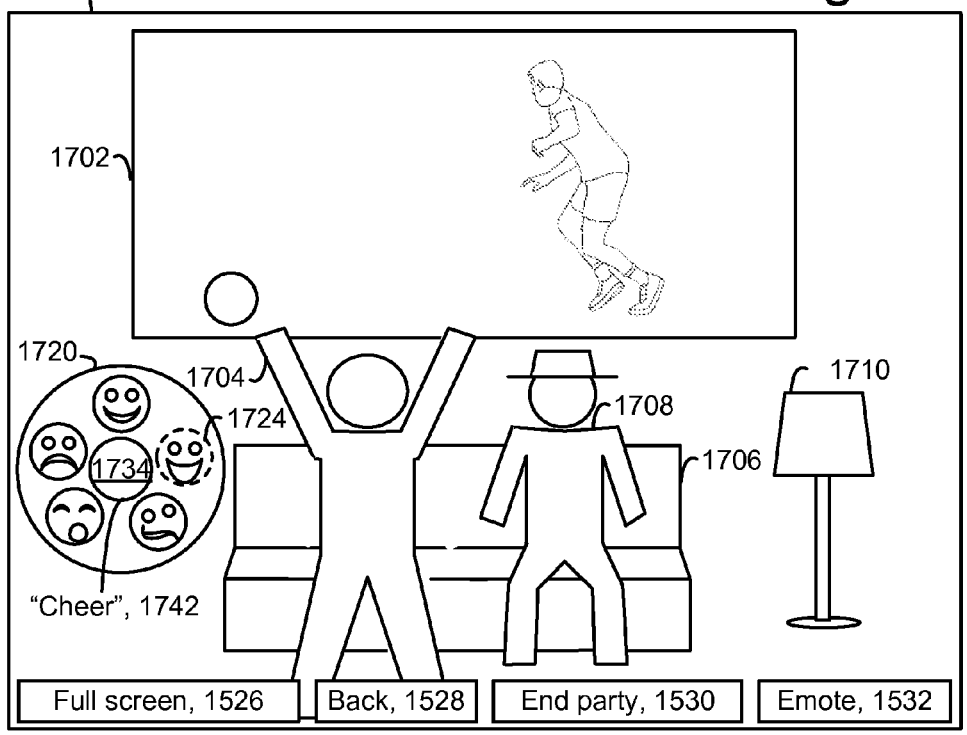
FIG. 17d depicts the user interface of FIG. 17b after another of the emoticons is selected, showing emoting of a first avatar by cheering.

FIG. 17d depicts the user interface of FIG. 17b after another of the emoticons is selected, showing emoting of a first avatar by cheering. When icon 1724 is selected, the user's avatar 1704 begins cheering, as indicated by the avatar standing up and raising the arms overhead in user interface 1740. Further, the textual description "Cheer" 1742 can appear in the center region 1734 of the menu 1720 when the icon 1724 is selected, as indicated by the dashed lines at the border of the icon 1724.

Figure 17E:
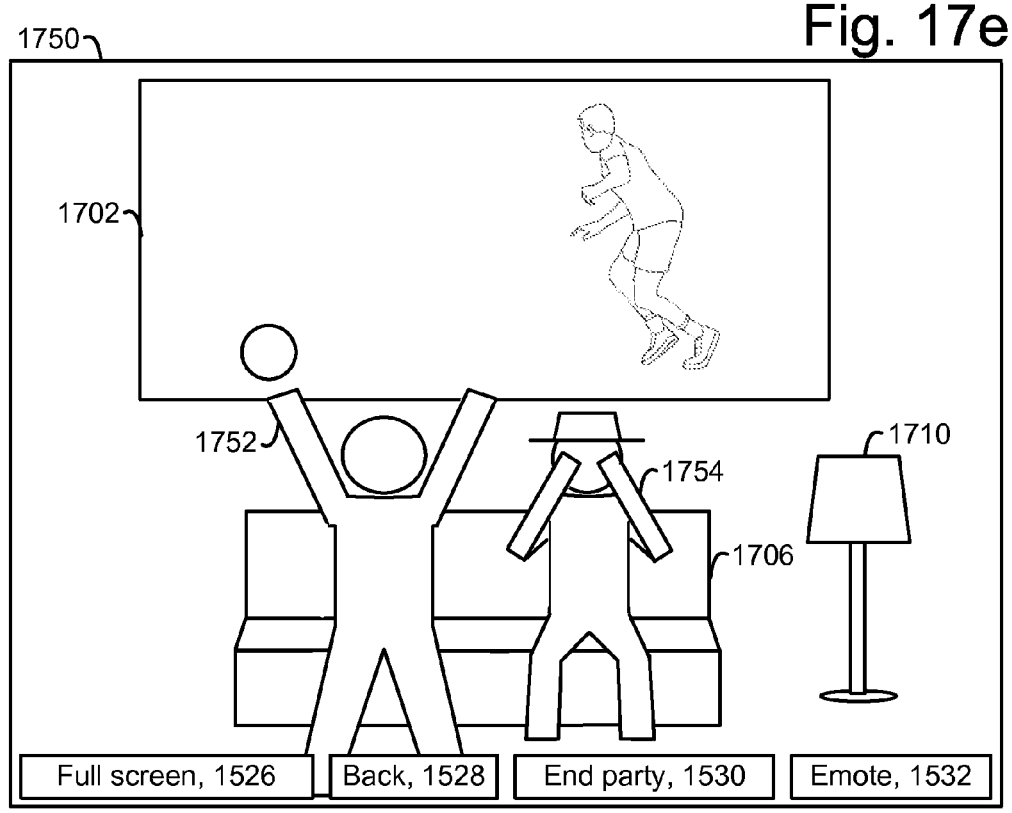
FIG. 17e depicts the user interface of FIG. 17b, showing emoting of first and second avatars.

FIG. 17e depicts the user interface of FIG. 17b, showing emoting of first and second avatars. In the user interface 1750, the friend avatar 1754 emotes, based on the emoticon 1726 which can be selected by the friend via a user interface similar to that of FIG. 17b. The menu 1720 is not displayed in this example. In one implementation, the emoticon menu disappears before the end of a time period in which the avatar emotes. Also, the emoticon menu need not appear on the user interface of the user when the friend's avatar emotes.

Figure 17F:
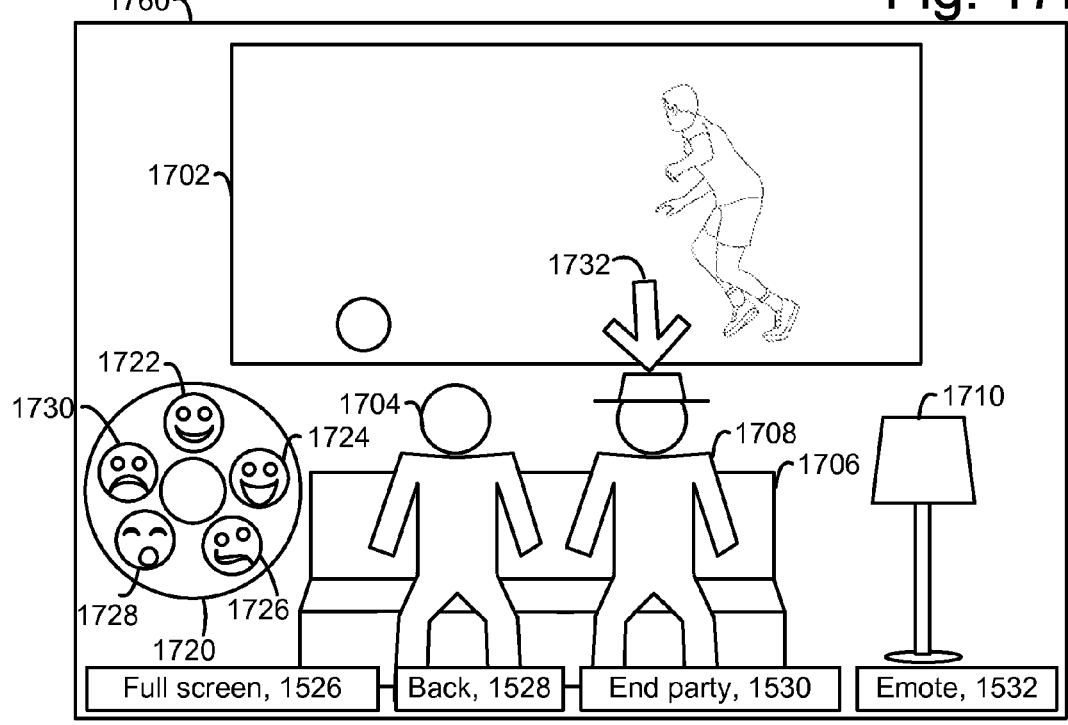
FIG. 17f depicts the user interface of FIG. 17b, showing a visual component which is manipulated to identify an avatar who is to be a recipient of a directed emote.

FIG. 17f depicts the user interface of FIG. 17b, showing a visual component which is manipulated to identify an avatar who is to be a recipient of a directed emote. Generally, emotes can include non-directed and directed emotes. A non-directed emote of an avatar is not directed to another particular avatar, but is generally an expression which is intended to be seen by any other avatar. On the other hand, a directed emote is directed from one avatar to one or more other specified avatars, and is an expression which is intended to be seen by the one or more specified avatars, in particular. This provides an added dimension of communication among the avatars. In one approach, the menu 1720 of emotes can identify the directed emotes using a different appearance. When a directed emote is selected by a first user, and there is only one other avatar present, it can be assumed that the directed emote is meant to be directed at that one other avatar, so there is no need for the first user to identify the recipient of the directed emote.

However, if there are multiple other avatars present in the shared environment, a command of the first user to select a directed emote can cause the user interface to display a visual component 1732 which is manipulated by the first user, e.g., using a thumb stick on a handheld remote controller, to identify the avatar who is to be the recipient or target of the directed emote. The visual component 1732 can be an arrow, for instance. Another example is to provide a beam of light which the first user can manipulate to shine on a particular avatar, thereby selecting the avatar as the target of the directed emote. After manipulating the visual component to select the avatar 1708, the first user can enter a further command which confirms the identity of the selected avatar, thereby initiating the directed emote. Or, the directed emote can be initiated when the avatar 1708 has been selected for a specified period of time such as a couple seconds without the first user providing a further command.

Figure 17G:
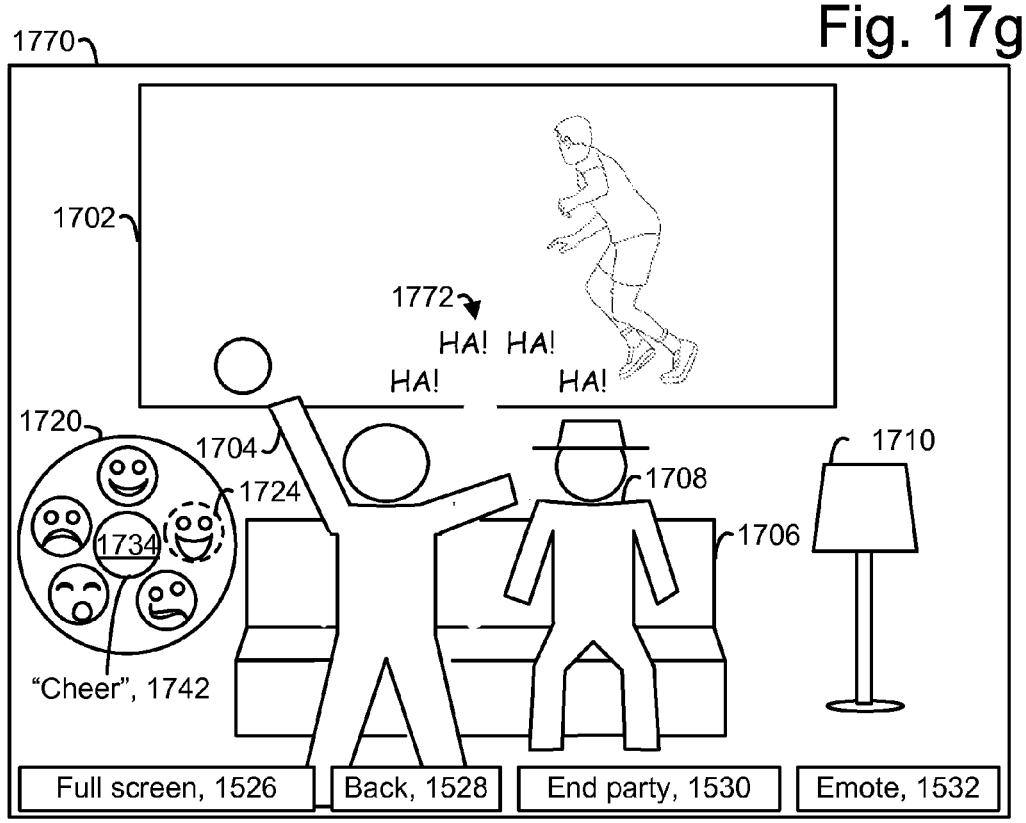
FIG. 17g depicts the user interface of FIG. 17f, showing a directed emote including a visual indicia which indicates that the directed emote is directed from one avatar to another.

FIG. 17g depicts the user interface of FIG. 17f, showing a directed emote including a visual indicia which indicates that the directed emote is directed from one avatar to another. In the user interface 1770, a visual indicia 1772 indicates that a directed emote of pointing and laughing is directed from the avatar 1704 to the avatar 1708. In this example, the visual indicia 1772 include the text "HA" repeated in a path from the avatar 1704 to the avatar 1708. Another example of a visual indicia include a stream of particle between the avatars. Another example alters a visual appears of the avatars such as by a special effect such as flashing, or changing their color.

Figure 18A:
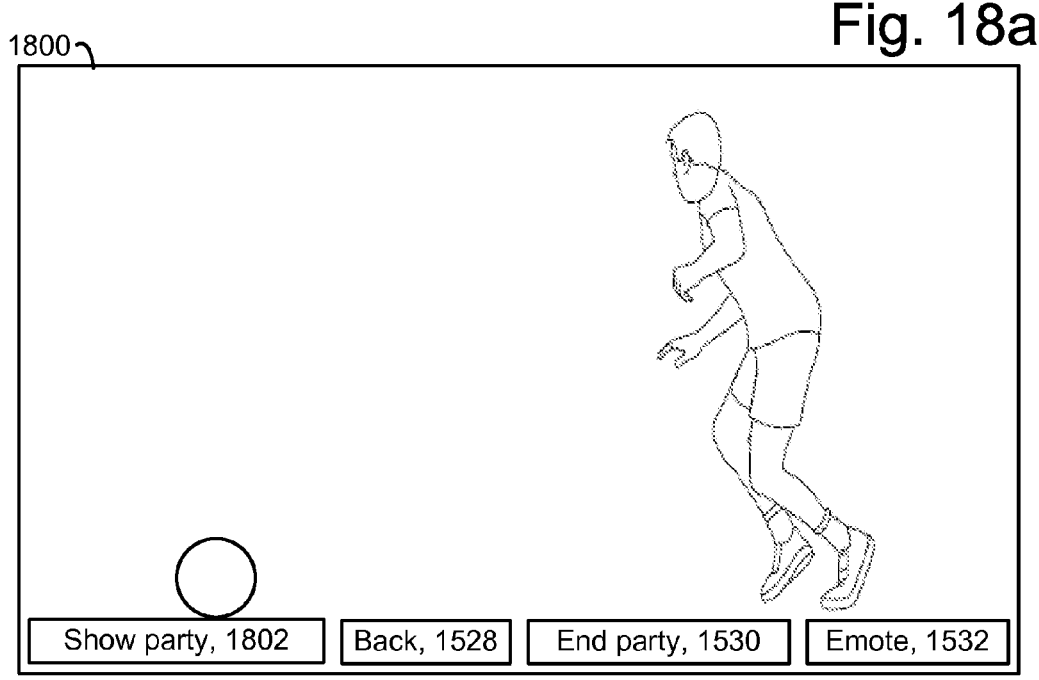
FIG. 18a depicts a user interface which provides video content in a full screen mode, while a shared environment is running in the background.

FIG. 18a depicts a user interface which provides video content in a full screen mode, while a shared environment is running in the background. The user can have the ability to enter commands via the handheld controller to control a display mode during the shared viewing experience. At some times, the user may wish to minimize any distraction which may be provided by the shared environment. At other times, the user may wish to spend more time viewing and exploring the shared environment. The user interface 1800 provides a full screen mode in which the video content is visible, but the shared environment including the avatars and scene elements are not visible. Menu items include a menu item 1802 "Show party" for providing a view of the shared environment, such as in the previously-discussed examples, a menu item 1528 ("Back") for returning to the previous user interface, a menu item 1530 ("End party") for ending the shared environment and returning to the view of FIG. 13a, and a menu item 1532 ("Emote") for causing the avatar to emote, thereby also returning to the view of FIG. 17b, for instance.

Figure 18B:
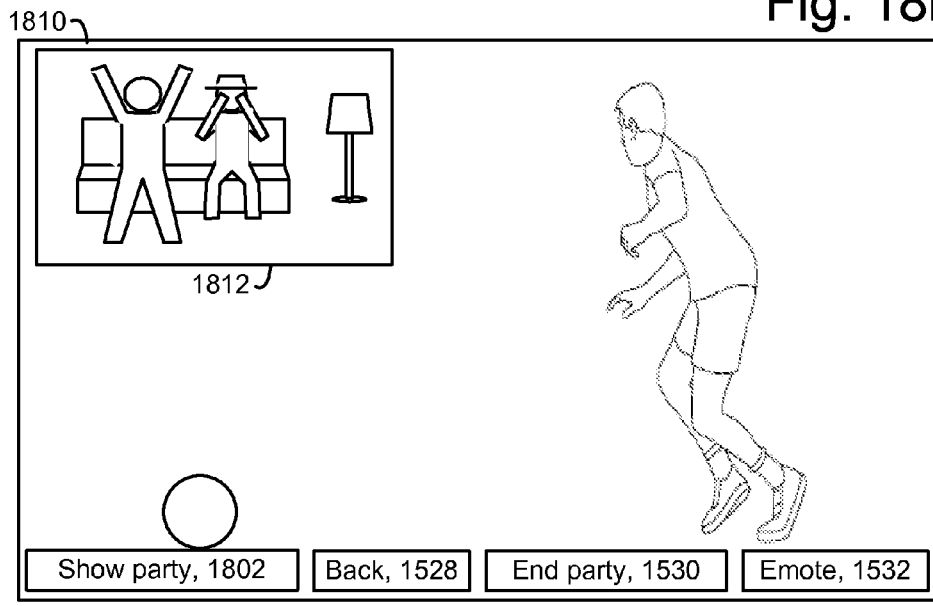
FIG. 18b depicts a user interface which provides video content with a shared environment in an inset or picture-in-picture window.

FIG. 18b depicts a user interface 1810 which provides video content with a shared environment in an inset or picture-in-picture window 1812. This view allows the user to see the shared environment while still focusing on the video content.

Figure 19:
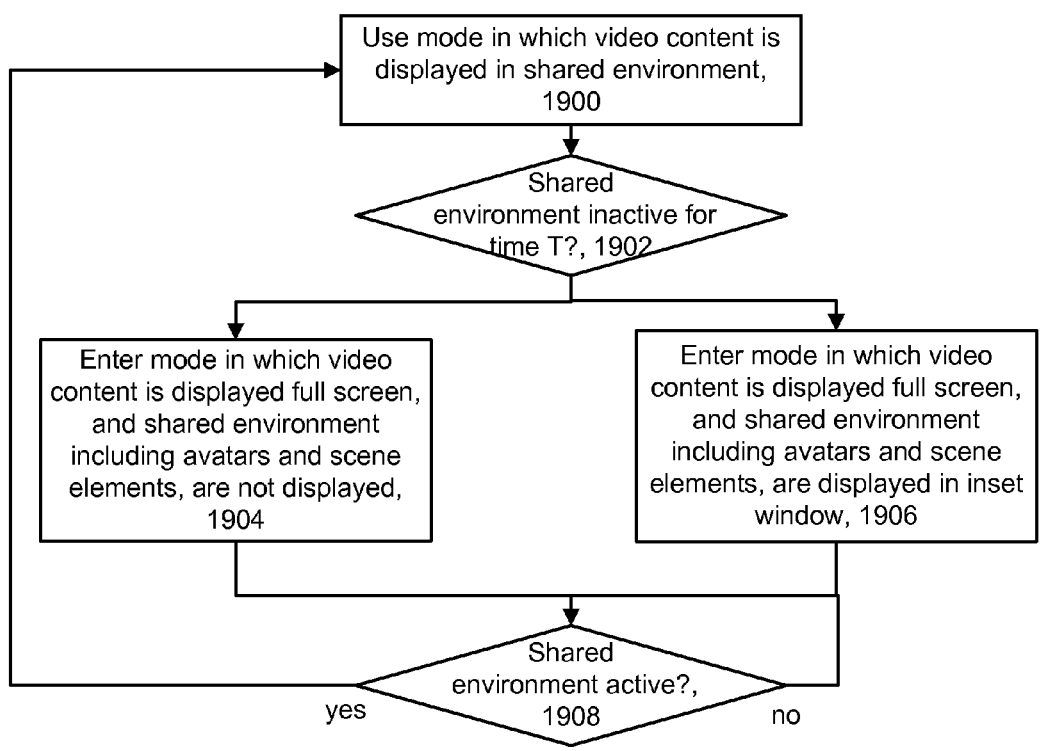
FIG. 19 depicts a process for switching user interface display modes.

FIG. 19 depicts a process for switching user interface display modes. At step 1900, the electronic media device uses a mode in which video content is displayed in a shared environment. This may occur when the shared environment initially begins, for instance. At decision step 1902, if the shared environment is inactive for a specified period of time T, then either options 1904 or 1906 may be used. The shared environment may be inactive, e.g., when the local user does not provide a command to view the shared environment, such as from a different camera angle, and no user provides an emote command. For example, the user may become immersed in viewing the video content and have no reason to emote or explore the shared environment. Step 1904 enters a mode in which the video content is displayed full screen, and the shared environment including the avatars and scene elements, are not displayed, such as depicted in FIG. 18a. Step 1906 enters a mode in which the video content is displayed full screen, and the shared environment including the avatars and scene elements, are displayed in an inset window, such as depicted in FIG. 18b. At decision step 1908, if the shared environment becomes active again, such as when the local user provides a command to view the shared environment, such as from a different camera angle, or any user provides an emote command, the mode of step 1900 is used again.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method for providing an interactive and shared viewing experience, comprising:
receiving streaming video content at a first electronic media device associated with a first user, the streaming video content is received via a network from a server;
displaying the streaming video content at a user interface of the first electronic media device in synchronicity with a display of the streaming video content at a second electronic media device associated with a second user;
displaying a first avatar, which represents the first user emoting on the user interface, based on data which describes an appearance of the first avatar and based on control inputs from the first user;
receiving data from the network which describes an appearance of a second avatar, which represents the second user;
receiving control inputs via the network for causing the second avatar to emote on the user interface, the control inputs for causing the second avatar to emote are provided by the second user via the second electronic media device;
displaying the second avatar emoting on the user interface based on the received data which describes the appearance of the second avatar and the control inputs provided by the second user, where the streaming video content and the first and second avatars are displayed on the user interface in a shared environment, the first and second users interact while viewing the streamed video content by causing the first and second avatars, respectively, to emote and the shared environment comprises a virtual world which comprises a display area on which the streaming video content is displayed and a spectator area in which the first and second avatars are located;
in response to a control input from the first user, changing a camera angle from which the virtual world is viewed on the user interface; and
in response to the changing of the camera angle, the display area is provided in a distorted perspective view and is repositioned in the virtual world so that the display area remains visible to the first user while the streaming video content continues to be displayed on the display area.

2. The processor-implemented method of claim 1, further comprising:
providing a plurality of selectable icons concurrently on the user interface, each icon represents a different emote, the icons have a different appearance based on whether they represent a directed emote or a non-directed emote, and the first user selects one of the icons to cause the first avatar to emote; and
communicating data from the first electronic media device to the second electronic media device to cause the first avatar to emote on a user interface of the second electronic media device.

3. The processor-implemented method of claim 1, wherein:
in response to a control input from the first user, the user interface transitions from a mode in which the streamed video content is displayed full screen, without the shared environment, and without the first and second avatars, to a mode in which the streamed video content is displayed with an inset window which comprises the shared environment, and the first and second avatars.

4. The processor-implemented method of claim 1, wherein:
in response to a control input requesting at least one of the first or second avatars to emote, the user interface automatically transitions from a mode in which the streaming video content is displayed without the shared environment, and without the first and second avatars, to a mode in which the streaming video content is displayed with the shared environment, and with the first and second avatars.

5. The processor-implemented method of claim 4, wherein:
in response to at least one of the first or second avatars concluding emoting, the user interface automatically transitions back from the mode in which the streaming video content is displayed with the shared environment and with the first and second avatars to the mode in which the streaming video content is displayed without the shared environment and without the first and second avatars.

6. The processor-implemented method of claim 1, wherein:
the first and second electronic media devices exchange timing information to display the streaming video content in synchronicity;
the timing information indicate a most recent key frame displayed by each of the first and second electronic media devices; and
the first electronic media device pauses the displaying of the streaming video content if the timing information indicates that the first electronic media device is faster than the second electronic media device by more than a specified amount.

7. The processor-implemented method of claim 1, further comprising:
displaying a message on the user interface responsive to the server, the message informs the first user that the second user is watching a same streaming video content and allows the first user to provide a control input to establish the interactive and shared viewing experience with the second user.

8. The processor-implemented method of claim 1, wherein:
the display area changes from a flat, straight ahead perspective to the distorted perspective view while the streaming video content continues to be displayed on the display area and as the camera angle is changed.

9. The processor-implemented method of claim 1, further comprising:
repositioning the display area in the shared environment from in front of the first avatar to behind the first avatar so that the display area remains visible to the first user as the camera angle is changed.

10. The processor-implemented method of claim 1, wherein:
the spectator area depicts furniture, the furniture has one color and style on the user interface of the first electronic media device which is set by the first user and another color and style on a user interface of the second electronic media device which is set by the second user.

11. The processor-implemented method of claim 1, further comprising:
retrieving an identifier of the streaming video content from the streaming video content;
in a database, cross-referencing the identifier to a theme for the shared environment; and
displaying the shared environment with the theme.

12. The processor-implemented method of claim 1, further comprising:
setting an appearance of the shared environment based on information obtained from a specified data field of the streaming video content.

13. The processor-implemented method of claim 12, wherein:
the information comprises at least one of a rating or a genre of the streaming video content.

14. The processor-implemented method of claim 1, further comprising:
providing an icon on the user interface which represents a directed emote, the first user selects the icon to cause the first avatar to perform the directed emote, and the directed emote provides a visual indicia on the user interface indicating that the directed emote is directed from the first avatar to the second avatar.

15. The processor-implemented method of claim 14, wherein:
the visual indicia extends in a stream from the first avatar to the second avatar.

16. The processor-implemented method of claim 14, wherein:
the visual indicia is provided by altering a visual appearance of the second avatar during the directed emote.

17. The processor-implemented method of claim 14, wherein:
the visual indicia is provided by at least one of flashing or changing a color of the second avatar during the directed emote.

18. The processor-implemented method of claim 14, wherein:
the visual indicia comprises particles which extend in the stream from the first avatar to the second avatar.

19. Tangible computer readable hardware memory device having computer readable software embodied thereon for programming a processor to perform a method at a first electronic media device, associated with a first user, the method comprising:
receiving streaming video content at the first electronic media device associated with the first user, the streaming video content is received via a network from a server;
displaying the streaming video content at a user interface of the first electronic media device in synchronicity with a display of the streaming video content at a second electronic media device associated with a second user;
displaying a first avatar, which represents the first user emoting on the user interface, based on data which describes an appearance of the first avatar and based on control inputs from the first user;
receiving data from the network which describes an appearance of a second avatar, which represents the second user;
receiving control inputs via the network for causing the second avatar to emote on the user interface, the control inputs for causing the second avatar to emote are provided by the second user via the second electronic media device;
displaying the second avatar emoting on the user interface based on the received data which describes the appearance of the second avatar and the control inputs provided by the second user, where the streaming video content and the first and second avatars are displayed on the user interface in a shared environment, the first and second users interact while viewing the streamed video content by causing the first and second avatars, respectively, to emote and the shared environment comprises a virtual world which comprises a display area on which the streaming video content is displayed and a spectator area in which the first and second avatars are located;
in response to a control input from the first user, changing a camera angle from which the virtual world is viewed on the user interface; and
in response to the changing of the camera angle, the display area is provided in a distorted perspective view and is repositioned in the virtual world so that the display area remains visible to the first user while the streaming video content continues to be displayed on the display area.

* * * * *